(12) United States Patent
Michel et al.

(10) Patent No.: US 7,983,397 B2
(45) Date of Patent: Jul. 19, 2011

(54) METHOD AND APPARATUS FOR DETERMINING ONE OR MORE CHARACTERISTICS OF RADIATION

(75) Inventors: Thilo Michel, Nuremberg (DE); Alexander Korn, Furth (DE); Gisela Anton, Erlangen (DE); Daniel Niederlohner, Erlangen (DE); Michael Bohnel, Karlshuld (DE); Markus Firsching, Erlangen (DE); Jurgen Durst, Dittenheim (DE)

(73) Assignee: Friedrich-Alexander-Universitat Erlangen-Nurnberg, Erlanger (DE)

( * ) Notice: Subject to any disclaimer, the term of this patent is extended or adjusted under 35 U.S.C. 154(b) by 393 days.

(21) Appl. No.: 12/160,831

(22) PCT Filed: Feb. 8, 2007

(86) PCT No.: PCT/EP2007/001088
§ 371 (c)(1),
(2), (4) Date: Jul. 14, 2008

(87) PCT Pub. No.: WO2007/090650
PCT Pub. Date: Aug. 16, 2007

(65) Prior Publication Data
US 2011/0051901 A1    Mar. 3, 2011

(30) Foreign Application Priority Data
Feb. 9, 2006    (DE) .......... 10 2006 006 411

(51) Int. Cl.
*H05G 1/28* (2006.01)
(52) U.S. Cl. .......... 378/165; 250/370.07; 378/207
(58) Field of Classification Search .......... 378/162, 378/207; 250/370.07
See application file for complete search history.

(56) References Cited

U.S. PATENT DOCUMENTS

| | | | |
|---|---|---|---|
| 4,156,139 A | 5/1979 | Bingo et al. | 250/308 |
| 4,859,853 A | 8/1989 | Kronenberg | 250/370.07 |
| 5,256,879 A | 10/1993 | McNulty et al. | 250/370.06 |
| 2004/0129888 A1 | 7/2004 | Kannan et al. | |

FOREIGN PATENT DOCUMENTS
FR    2515830    5/1983

*Primary Examiner* — Courtney Thomas
(74) *Attorney, Agent, or Firm* — Dennison, Schultz & MacDonald

(57) ABSTRACT

The present invention relates to a device and method for determining one or more characteristics of radiation using a sensor comprising one or more detector units capable of counting the number of photon or charged particle of said radiation impinging on said sensor in or above a determined energy range.

11 Claims, 14 Drawing Sheets

| lower threshhold=E_5 | lower threshhold=E_1 |
| upper threshhold=E_6 | upper threshhold=E_2 |
| i=5 | i=1 |
| lower threshhold=E_6 | lower threshhold=E_2 |
| upper threshhold=E_7 | upper threshhold=E_3 |
| i=6 | i=2 |
| lower threshhold=E_7 | lower threshhold=E_3 |
| upper threshhold=E_8 | upper threshhold=E_4 |
| i=7 | i=3 |
| lower threshhold=E_8 | lower threshhold=E_4 |
| upper threshhold=E_9 | upper threshhold=E_5 |
| i=8 | i=4 |

Fig. 6

METHOD AND APPARATUS FOR DETERMINING ONE OR MORE CHARACTERISTICS OF RADIATION

TECHNICAL FIELD

The invention relates to the field of dosimetry. More particularly, it relates to a method and apparatus for determining one or more characteristics of radiation, comprising the dose, the energy spectrum, the maximum energy and/or other characteristics. The method and the apparatus can be used in an apparatus for the determination of dose quantities, for example in personal or ambient dosimeters, in an apparatus for the determination of dose quantities in the beam of irradiation facilities, in an apparatus for the determination of dose quantities in aircrafts, in an apparatus for the determination of energy spectra of incoming radiation.

DESCRIPTION OF RELATED ART

Passive dosimeters such as film dosimeters, thermo luminescent dosimeters (TLDs) and radiophoto luminescent (RPLs) dosimeters are well known in personal dosimetry. Especially film dosimeters are widely used. Passive dosimeters need some processing after exposure to the radiation for giving a measurement. A TLD, e.g. needs a development phase, followed by a measurement of the optical density. Passive dosimeters are able to determine dose quantities with a sufficient accuracy in energy ranges which are defined by law. One advantage of film dosimeters is that they are compact and light weighted. They also offer the possibility to determine the mean incident angle of incoming radiation which allows improvements in the accuracy of the measured values. Information about the energy of the incoming radiation is gained through the placement of absorbers over the radiation sensitive film. The overall precision of the mean energy is limited: the accuracy is about 30 keV in the energy range between 20 and 120 keV (see P. Ambrosi, *Measurement of photon energy and dose rate*, Radiation Protection Dosimetry (2004), Vol. 112, No. 4, pp. 483-486 [Reference 1]). The uncertainty concerning the determined energy increases with increasing energy of the incoming radiation.

In contrast to passive dosimeters, active personal dosimeters are able to determine dose quantities in real time and therefore they provide the user with information about dose rate values. Active personal dosimeters use semiconductor detectors, scintillation detectors, Geiger-Mueller-Counters or ionization chambers. Dosimeters with ionization chambers consist of charged capacitors which discharge under impinging radiation. The amount of discharge is displayed. The semiconductor detectors used in active personal dosimeters are made of silicon, CdZnTe or HgGe. No information on the energy of the incoming radiation is provided by active personal dosimeters. There are dosimeters which use information about the incoming spectrum. There are dosimeters, for example the EPD Mk2 dosimeter of the Thermo Electron Corporation, which have one or several energy channels in order to increase the precision of the dose quantities. The EPD Mk2 has one energy channel for soft gamma radiation (20-60 keV) and one channel for hard gamma radiation (50 keV-5 MeV). In reference [1], it is explained, that dose quantities are calculated from a combination of both channels. Reference [1] states, that there is no active personal dosimeter in the market that displays energy information. The energy range concerning the energy of the incident radiation of commercially available active personal dosimeters lies between 10 keV and 10 MeV. The relative error in the dose value ranges between 10 and 30%, following reference [2], page 147. A list of some commercially available active personal dosimeters can be found in (T. Bolognese-Milsztajn et al., *Active personal dosemeters for individualmonitoring and other new developments*, Radiation Protection Dosimetry (2004), Vol. 112, No. 1, pp. 141-168 [Reference 2]). The range for the determination of Hp lies between 15 nSv and 16 Sv, following [2]. Some known active personal dosemeters are: Thermo Electron EPD1, Thermo Electron Mk2, Dosiman, Dositec L36, MGP DMC 2000. All these dosimeters work in integrating mode, i.e. they derive a dose value by integrating the charge released in a sensitive material by a large number of impinging particles, during an irradiation period. They do not analyse the signal produced by each impinging particle separately, and don't rely on the energy spectrum of the incident radiation.

PRIOR ART DISCUSSION

A medical imaging device and apparatus is known from WO 02/063339, having an X-ray detector formed of an array of semiconductor pixel detectors. Each individual detector has an associated electric circuit and counter. When an X-ray is incident upon a detector pixel, a number of electron-holes pairs are formed in the semiconductor. The charge is transferred to a read out circuit. By reading simultaneously the readouts corresponding to the pixels of the array, while irradiating an object with an X-ray beam, one obtains an image of said object. No information is given however, as to the use of such a detector and counter circuit for dosimetry.

A process for spectrometric photon dosimetry is known from German patent application DE 10 2005 026 757 which was published after the priority date of the present invention. The process requires a multichannel analyzer, and therefore cannot be executed in a simple portable device.

Another process for determination of photon spectra is known from DE 197 30 242. When using a multichannel analyzer, the above drawbacks of the multi-channel analyzer are experienced. When using a plurality of window discriminators, the same signal is processed by these disciminators. Therefore, a copy of the input signal must be made, which leads to low energetic photons, due to the electronic noise generated.

The use of an array of detectors and counter circuit for dosimetry is known from WO 2005/008286. This document does not however describe how to calibrate the apparatus. Dose rate and dose are determined by long term integration, and therefore has the drawbacks of the integrating dosimeters cited above.

It is an object of the present invention to provide a method and apparatus for determining one or more characteristics of radiation with high precision, high sensitivity and a large measuring range concerning particle flux density in a wide energy range, especially in the radiological diagnostics range, where the measurement is carried out in real time. It is also an object of the present invention to provide a method and apparatus for the determination of energy information of incident radiation like for example the energy spectrum or the highest energy in the spectrum, whereby the measurement can be carried out with a very high particle flux density. Such an apparatus can be used in quality assurance of medical radiation installations, e.g. X-ray tubes, or in an apparatus for the determination of the peak values of tube voltages (kVp-measurement).

SUMMARY OF THE INVENTION

According to a first aspect, the invention is directed to a method for determining one or more characteristics of radiation using a sensor comprising one or more detector units capable of counting the number of photon or charged particle of said radiation impinging on said sensor in or above a determined energy range. The method comprises the steps of performing a calibration operation comprising the steps of
(i) producing a beam k of radiation, said beam producing a known dose $D^k$, said beam being either produced physically or simulated with a model;
(ii) determining the counts $N^k_i$ of said radiation beam comprised in an energy deposition range $[E_i, E'_i]$, said determination being obtained either by actual measurement or by a computation based on said model;
(iii) repeating step (ii) from i=1 to i=imax for a set of different energy deposition ranges $[E_i, E'_i]$;
(iv) repeating steps (i), (ii) and (iii) for a range of different beams k of radiation;
(v) determining factors $L_i$ by solving the coupled set of equations, for all k $$D^k = \Sigma_{i=1}^{i=imax} L_i \cdot N^k_i,$$

submitting the sensor to the radiation to be measured and determining the deposition spectrum by measuring the counts $N_i$ in the energy deposition ranges $[E_i, E'_i]$;
determining the dose according to the equation $$D = \Sigma_{i=1}^{i=imax} L_i \cdot N_i$$

According to a second aspect, the invention is directed to a method for determining one or more characteristics of radiation using a sensor comprising one or more detector units capable of counting the number of photon or charged particle of said radiation impinging on said sensor in or above a determined energy range. The methods comprises the steps of performing a calibration operation comprising the steps of
(i) producing a monoenergetic beam of radiation with energy $E_k^{mono}$, said beam being either produced physically or simulated with a model;
(ii) determining the counts $M_{ik}$ of said radiation beam comprised in a set of energy deposition ranges $[E_i, E'_i]$, said determination being obtained either by actual measurement or by a computation based on said model;
(iii) normalizing said counts $M_{ik}$ by dividing these by the total number of impinging particles;
(iv) repeating steps (i), (ii) and (iii) for a range of different monoenergetic beams of radiation $E_k^{mono}$, from k=1 to k=kmax;
submitting the sensor to the radiation to be measured and determining the deposition spectrum by measuring the counts $N_i$ in the energy deposition ranges $[E_i, E'_i]$;
determining the energy spectrum $\overline{N}_k$ by solving the coupled set of equations, for all i, $$N_i = \Sigma_{k=1}^{k=kmax} M_{ik} \cdot \overline{N}_k$$

where $M_{ik}$ are the normalized counts obtained in step (iii).
In a preferred embodiment, the characteristic of radiation is a dose quantity and this method further comprises the steps of
using predetermined conversion coefficients $C_k$ giving the dose quantity to be determined resulting from a unit fluence, said coefficient $C_k$ being either the ICRU coefficients $K_k$ for air kerma per unit fluence, for dose in air, or the Hp(0.07) coefficients, for dose at a depth of 0.07 mm, or the Hp(10) coefficients, for dose at a depth of 10 mm, for each energy $E_k^{mono}$;
determining the respective dose D according to the equation, wherein A is the surface area of said sensor, $$D = \Sigma_{k=1}^{k=kmax} C_k \cdot \overline{N}_k / A$$

In the above methods according to the first and second aspect of the invention, the solving of the coupled set of equations is performed by estimation, by the maximum-likelihood method, or by an iterative method.

According to a third aspect, the invention is directed to a method for determining one or more characteristics of radiation using a sensor comprising one detector unit capable of counting the number of photons or charged particles of said radiation impinging on said sensor between or above one or more determined energy thresholds and adapted for modifying said energy thresholds in time. This method comprises the steps of
(a) setting the one or more thresholds of said detector to selected values;
(b) counting the number of detected signals with energies above said thresholds during an interval of time;
(c) modifying said thresholds;
(d) repeating steps (b) and (c) until a range of energies is covered and a spectrum is obtained.

According to a fourth aspect, the invention is directed to an apparatus for measuring one or more characteristics of radiation, comprising one or more detector units, each detector unit comprising
a sensor producing an electrical pulse in response to a photon or charged particle of said radiation impinging on said sensor;
one or more discriminators each having a threshold, and having means for comparing a value of said electrical pulse with said threshold and producing a signal in response to said value exceeding said threshold;
a counter associated with each of said discriminators for counting the number of said signals;
said apparatus comprising a calculation unit (2) adapted for computing said characteristics of said radiation from the counter data and a control unit (5) adapted for modifying said thresholds in time and/or for each detector unit.

Said means for comparing a value of said electrical pulse may be means for comparing the height of said pulse with said threshold.

Said means for comparing a value of said electrical pulse may also comprise means for integrating said electrical pulse, and means for comparing the integral value with said threshold.

Said characteristic of radiation may comprise the energy spectrum of said radiation, the maximum radiation energy or the dose.

A layer of absorbing material may be placed above a detector unit.

Preferably, a plurality of layers of absorbing material, each layer having a different thickness and/or consisting of a different material, are placed each above one or more detector units Other features, details and advantages of the invention will appear from the non-limiting detailed description given hereafter.

BRIEF DESCRIPTION OF THE DRAWINGS

FIG. 6 is another example of an arrangement of energy deposition thresholds in an array of detector units.

DETAILED DESCRIPTION OF THE INVENTION

Figure 1:
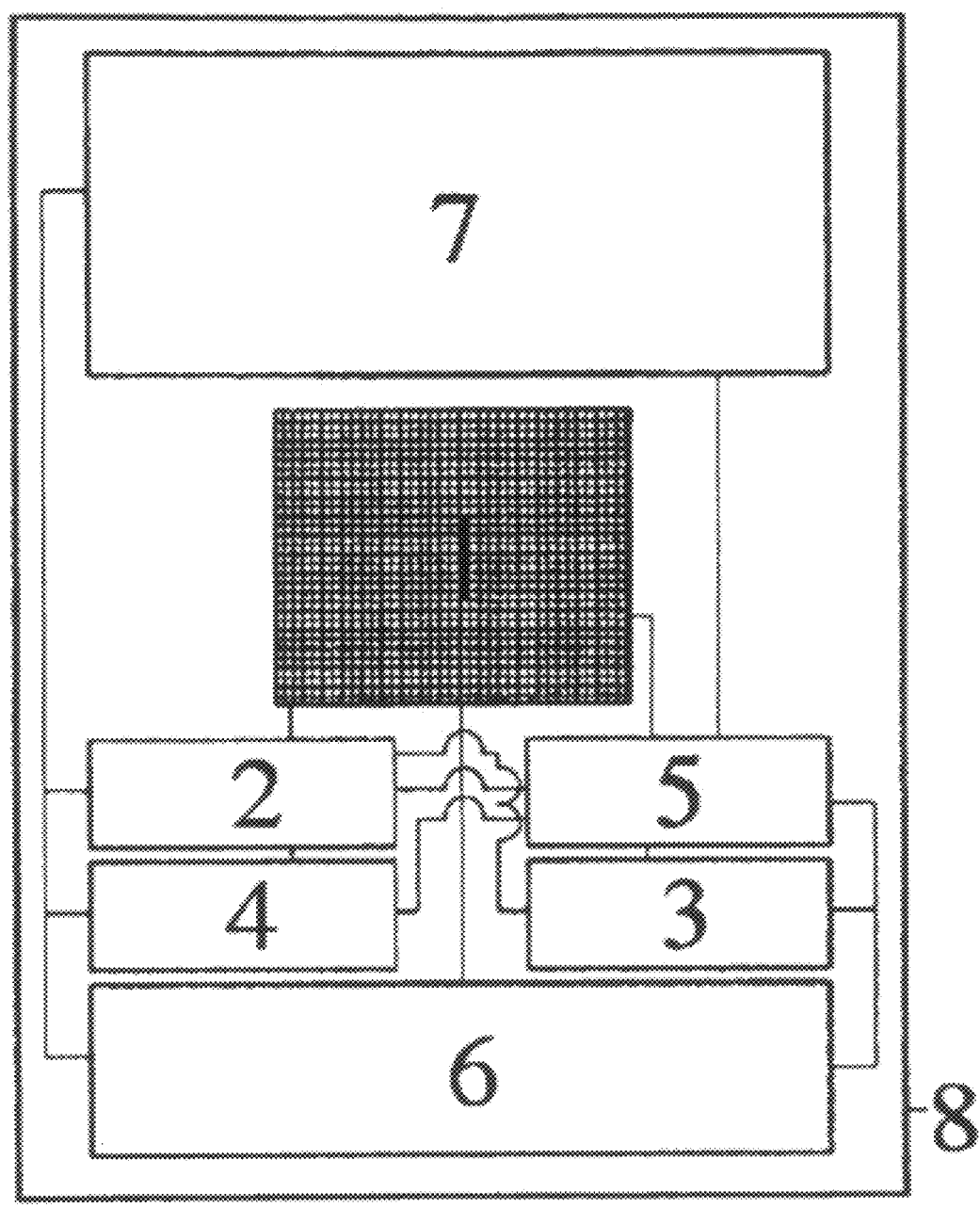
FIG. 1 is a schematic block diagram of an apparatus of the invention.

In the following, we distinguish between the spectrum of the deposited energies, named as energy deposition spectrum or shortly as deposition spectrum, and the spectrum of energies of the incident particles, named energy spectrum.

FIG. 1

The apparatus of the invention comprises of at least one detector unit and other components. The use of a plurality of such detector units offers several advantages, as will be seen hereafter. It is possible to use a sensor which goes through all detector units. This is the case in the example of embodiment. A detector unit comprises the following (partly optional) components:
   an absorber (optional);
   a sensor;
   an collection arrangement (optional);
   a converter;
   an amplifier (optional);
   discriminators and (optional) integrators;
   counters.

Components of the apparatus comprise:
   a calculation unit 2;
   an transmission unit 3 (optional);
   a memory unit 4 (optional);
   a control unit 5;
   a power supply unit 6;
   a display 7 (optional);
   a housing 8;

At least one of a transmission unit 3, a memory unit 4 or display 7 is necessary.

FIG. 1 displays an apparatus according to the invention. An array 1 of detector units is arranged for receiving a radiation. The main direction of incidence is perpendicular to the drawing plane. The components are now described in detail:

Absorber

The use of an absorber 9 is optional. The absorber, not shown of FIG. 1, is located above array 1 or part thereof. Materials which are necessary to ensure the operation of a detector unit, like electrodes, are not considered as an absorber. Nor shall the housing be considered as an absorber. The absorbers can be located in front of the sensors (viewed in the main direction of incidence of radiation). The use of different materials and thicknesses is possible. The absorption of particles depends on their energy, the absorber material and the particle type. Thus the energy spectrum is modified in a material, thickness and particle type dependent manner. The signals of the detector units behind the different absorbers can be used to determine dose contributions of different particle types or to derive energy information about the incident spectrum. Absorbers can be used to determine the mean angle of incidence through an analysis of the signals of the detector units in the shadow areas under the absorber. Corrections if the measured spectra or the determined dose values can be carried out using this mean angle of incidence. To do this it is necessary to place several detector units underneath the edge of the absorber. The absorbers can be placed in a way that they surround the sensors or detector units in several directions.

Sensor

The sensor layer 10 is a material volume, in which incident photons or charged particles, for example electrons, positrons or Alpha-particles, deposit energy in form of electron/hole-pairs or excitation energy. Sensor materials can be a semiconductor (for example Silicon, GaAs or Cd(Zn)Te) or a scintillator. If a semiconductor is used, incident particles produce electron/hole-pairs in the sensor, which are separated by an applied electric field. This field is produced by an electric voltage applied on electrodes on the semiconductor. If a scintillator is used, the excitation energy of the atoms is converted into scintillation light.

Collection Unit

If a scintillation sensor is used it is possible to use light guides or wavelength shifters to collect and transport the scintillation light to the converters.

Converter

When a semiconductor sensor is used, this converter is an electrode which is located in or on the semiconductor sensor. The converter converts the electrons or holes which drift in the applied electric field to the electrode into an electric pulse. The strength of this pulse or the charge flowing during its duration depends on the energy deposition in the sensor. When a scintillator sensor is used, it is necessary to convert the scintillation light into an electrical pulse. This can be done for example through photodiodes or photo-avalanche diodes or other tools to convert light into electrical pulses.

Amplifier

The electric pulse signals of the converters can be amplified by an electrical circuit.

Integrators and Discriminators

If the charge flowing during the duration of the pulse in the converter is a good measure of the energy deposited by the particle, the signals of the amplifiers or the converters are integrated with an electric circuit and compared to at minimum one adjustable threshold of a discriminator. If the height of the pulse in the converter is a better measure of the energy deposited by the particle, the signals of the amplifiers or the converters are not integrated and the pulse height is compared to at minimum one adjustable threshold of a discriminator. Pulses at the output of the discriminator appear if the threshold is overstepped. If several thresholds should be used, it can have advantages to produce signal copies at the outputs of the converters, amplifiers or integrators in order to compare the signal produced by one particle with various thresholds almost simultaneously. The discriminators are connected to counters in a manner that allows the incrementation of a counter or a transformation of the counter in a state so that afterwards the number of registered particles can be determined. In the following, we assume for simplicity that each counter is incremented by 1 for each registered event. Each counter therefore counts the number of events which have an energy deposition in an interval which is defined through the discriminator thresholds or is greater than the discriminator threshold. The level $E_i$ of the $i^{th}$ threshold corresponds to a certain amount of energy deposition in the sensor. The dependence of this threshold value $E_i$ on the pulse height or pulse integral can be determined through simulation or measurement under incidence of radiation with known particle energies. If only one threshold per detector unit is used, it is possible to work with only one counter per detector unit. This counter counts all events with an energy deposition in the sensor greater than $E_1$. We label the number of these events with $N_1$.

If two thresholds $E_1<E_2$ in the discriminators of the detector unit are used, two counters can be connected in a way with the discriminators, that one counter counts in $N_1$ all events with energy deposition greater than $E_1$ and the other counter counts in $N_2$ all events with energy deposition greater than $E_2$. The number of events with energy deposition in the interval $[E_1; E_2]$ is then the difference between $N_1$ and $N_2$: $N_{1,2}=N_1-N_2$.

If three thresholds $E_1<E_2<E_3$ and three counters, counting if the energy deposited is above the corresponding threshold, are in use so that after a certain measuring time the counters show the values $N_1$, $N_2$, $N_3$, the number of events $N_{1,2}$ with energy deposition in the interval $[E_1; E_2]$ is calculated as $N_1-N_2$. The number of events $N_{2,3}$ with energy deposition in the interval $[E_2; E_3]$ is calculated as $N_2-N_3$ and the number of events with energy deposition greater than $E_3$ as $N_{3,4}:=N_3$. If more than three thresholds per detector unit are used, the subsequent components $N_{i,i+1}$ of the sequence are calculated in an analogous manner.

The operation principle in which a counter is incremented if the corresponding threshold is exceeded, independently of the condition if other thresholds of a discriminator are exceeded or not, will be called exceeding-method in the following. If only one threshold is in use, the method will also be called exceeding-method.

If a detector unit has two discriminators with thresholds $E_1<E_2$, a counter showing the value $N_{1,2}$ after a certain measuring time can be connected in such a way with the discriminators that the energy deposition has to exceed $E_i$ but must not exceed $E_2$ in order to increase the counter value $N_{1,2}$. In this case the counter value $N_{1,2}$ is the number of events with energy deposition in the interval $[E_1; E_2]$. The principle of operation in which counters are incremented, if a corresponding threshold is exceeded and a certain higher threshold is not exceeded, will be called window-method in the following.

It is possible to realize electric circuits in which exceeding- and window-method are combined. Characteristic for all usable electric circuits is, that it is possible after a certain measuring time to get the number of events with energy deposition in certain intervals $[E_i; E_{i+1}]$ via subtraction of counter values $N_{i,i+1}:=N_i-N_{i+1}$ or direct use of counter values in the window-method $N_{i,i+1}$. Preferably the thresholds or windows are selected so that the overlapping of the energy intervals in minimal. If only one discriminator threshold is available, the series $N_{i,i+1}$ can be derived by measuring a certain time with constant threshold $E_i$ and subsequent new measurement with changed threshold $E_{i+1}$. We assume for simplicity that $E_{i+1}>E_i$.

To obtain the necessary series $N_{i,i+1}$ one has to subtract the counter values taken at one threshold from the counter values taken at the subsequent higher threshold. The operation method where the series $N_{i,i+1}$ is obtained through subsequent measurements at different thresholds shall be labeled in the following as scan method. The scan method can be combined with the exceeding- or the window-method. The determination of the series $N_{i,i+1}$ is in principle possible through the use of a multi-channel-analyzer. The disadvantage of the use of such a multi-channel-analyzer-electronics is that the time for the determination of the interval belonging to the energy deposition of an event is so long, that the maximum value of the particle flux density is strongly limited leading to a reduced dynamic range of the system.

Calculation Unit

The counters of the detector units are connected to a calculation unit, which is preferable realized as an integrated circuit. The calculation unit allows the executing of arithmetical operations with the counter values transmitted from the counters. The calculation unit uses one of the measures described below for calculating dose values or obtaining energy information from the counter values of one or several detector units. The used measure depends for example on the operation principle of the discriminators and counters and the needed precision. In order to determine dose rate values or the particle flux it is necessary to include information about the measuring time in the calculations. The whole system therefore contains electrical circuits which generate or count time signals. It is also possible to include circuits in the system which calculate the part of the time in which the counters have been able to register events. The calculation unit can carry out corrections of the so called dead-time during calculations of dose value or dose rate values. Preferably the system uses the amount of time as a basis for calculating dose rate values in which the detector units have been able to register events.

Transmission Unit

The transmission unit 3 is an electric circuit which transmits the discriminator pulses, the counter values or the values calculated by the calculation unit to the memory unit 4, the display 7 or to an apparatus, not belonging to the system, for post-processing, analysis, saving or displaying. This can be carried out with a cable or via wireless communication.

Memory Unit

The memory unit 4 can store the signals of the discriminators, the counter values, the calculated values of the calculation unit or time information electrically, optically or magnetically.

Display

The values calculated by the calculation unit or information about the status of the system can be displayed in a display 7. The user may be informed if the system is ready to use or if errors occurred. The display can show the energy information or dose values for information of the user. Possible embodiment forms of the display 7 are a commonly used LCD-Monitor or LCD-Display.

Controlling Unit

The controlling unit is an electrical circuit which provides the detector units, calculation unit, transmission unit, memory unit, display 7 and power supply unit 6 with electrical signals for their adjustment or controlling or synchronization and eventually contains a circuit for time measurements.

Power Supply Unit

The power supply unit 6 can be realized as a battery, current transformer or a cable to external power supplies. The power supply 6 ensures that all circuits and detector units are supplied with electric energy.

Housing

A housing 8 contains all elements of the apparatus. One of its purposes is the protection of the apparatus against disturbance from the environment and the protection of the user. Eventually the housing has some windows which allow the passage of particles to the sensors.

The goal of determining the energy spectrum or dose values can be reached using different combinations, characterized for example by number and type of absorbers, number and type of detector units, method of discrimination and counting in the detector units, type and dimensions of the sensor volume and type of used measures for the analysis of the detector unit data. All arrangements described in this invention which aim at the determination of the energy spectrum and eventually the calculation of dose values with the energy spectrum have to measure as a first step the deposition spectrum via sampling with different or varying discriminator thresholds. The determination of dose values is also possible without prior determination of the energy spectrum. It is possible to guess the dose values from the counter values. These measures are described below.

The maximum particle energy of incident radiation can be derived easily as the mean value of the interval limits in the highest energy interval $[E_j; E_{j+1}]$ which has registered a number of events $N_{j,j+1}$ significantly different from zero. The energy deposition and the detection efficiency normally depend on the angle of incidence of the particles. The simulations or measurements carried out for determination of factors or dependence curves, which are needed in the analysis measures described below, should be carried out at different incidence angles or with angular distributions similar to the angular distribution of the radiation whose properties should be measured with the apparatus.

In the following some embodiment forms of the arrangement of detector units are described. Measures for the determination of energy spectra or dose values are also described in detail. First an arrangement of several counting detector units is described.

FIG. 2

Figure 2:
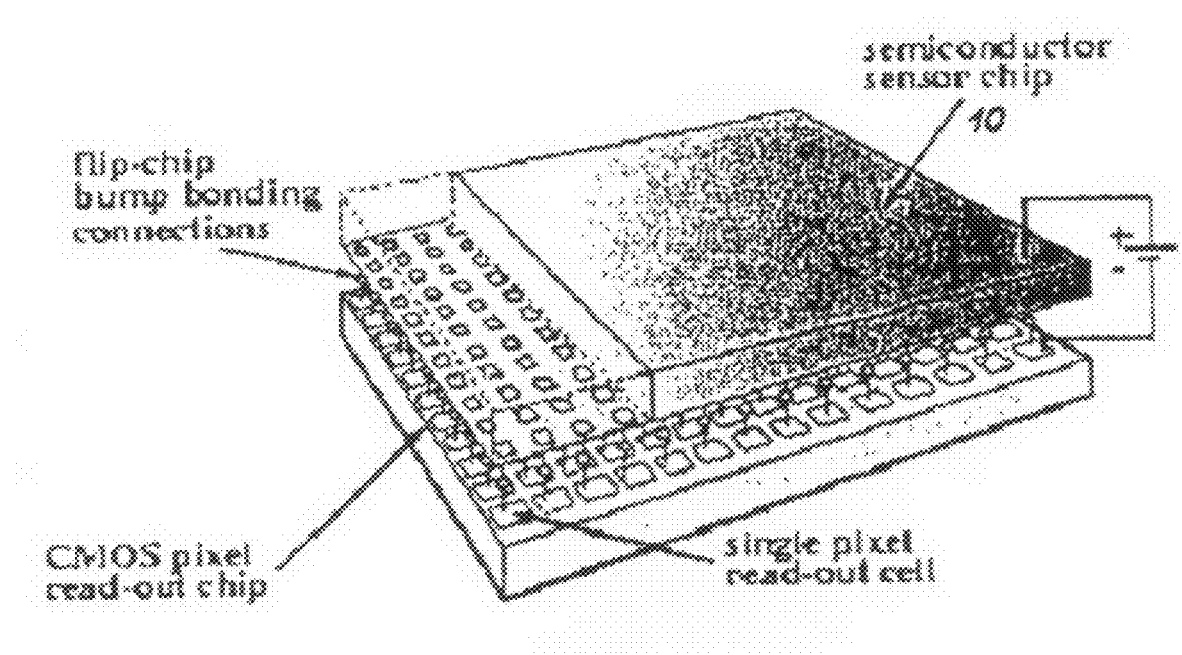
FIG. 2 is a perspective view of an array of detector units and a sensor layer to be used in the apparatus of FIG. 1.

As an array 1 of detector units, we use, as shown in FIG. 2, the Medipix2 chip and a sensor layer of silicon of 700 μm thickness. The active area of the Medipix2 chip and of the sensor layer have a square shape with a side length of around 14 mm. The Medipix2 chip comprises an array of 256 by 256 electronic cells, each cell including a discriminator and counter electronics. The sensor layer is provided at the bottom side with 256 by 256 electrodes which are contacted via bump bonds with the corresponding cells of the Medipix2 chip. The distance between two bump bonds is 55 μm. A conducting layer covers the whole area of the top side of sensor layer 10, and forms a top electrode. To obtain an electric field across the sensor layer 10, a voltage of around 50 V is applied between the top and bottom electrodes of the sensor layer. This voltage is supplied by the electric power supply unit 6. The combination of a single Medipix2 cell with the volume of sensor layer 10 immediately above it, bonded together by a bump bond form a detector unit. If radiation is directed to the sensor layer 10, a single photon or a single electron of said radiation may deposit energy in the sensor layer. As a result of this single photon or electron, a multitude of electrons-holes pairs are produced and separated from each other by the applied electric field. The amount of electrons and holes is dependent on the energy of the impinging photon or electron. The electrons or the holes drift towards the electrodes on the bottom side of sensor layer. An electric current is flowing into the input electrodes of the Medipix2 chip electronic cell. The current pulse is integrated and compared to an adjustable threshold $V_{thr,low}$. If the integrated current pulse oversteps the threshold, the counter of the detector unit electronic is incremented. The counter is able to count at maximum 8000 events between two readout cycles. The electronic cell of the Medipix2 chip has the possibility to apply additionally an upper threshold $V_{thr,high}$. If the condition $V_{thr,low} < V_{thr,high}$ is satisfied the counter counts the number of events which deposit an energy between the corresponding thresholds $V_{thr,low}$ and $V_{thr,high}$. This means that in this case the detector unit is operated in the window-method. The energy precision is around 1 keV. A detector unit is formed by one of the 256×256 cells of the Medipix2-electronics, the bump-bond-ball and the sensor volume between the electrode connected to the bump-bond-ball and the upper side of the sensor layer. In this example of embodiment, the arrangement of counting detector units is formed by 256×256 detector units.

FIG. 3

Figure 3:
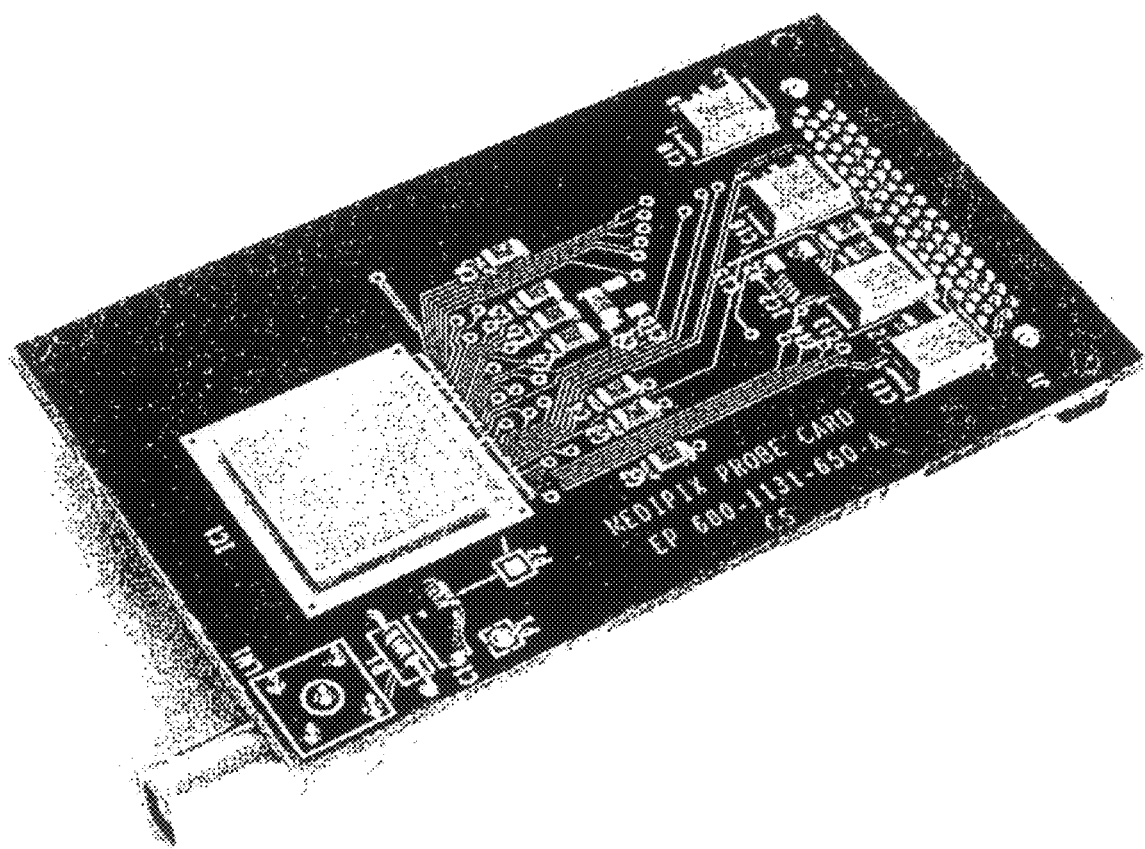
FIG. 3 is a photograph of a detector used in the invention, built according to the block diagram of FIG. 1 and using the array of detector units and sensor of FIG. 2.

FIG. 3 is a picture of a Medipix2-Sensor combination and shows that the whole arrangement has a very compact design. Such a combination enables the design of a very compact dosimeter.

Methods and Apparatuses Using Several Detector Units

Each detector unit is provided with at least one discriminator and at least with one counter. For example it is possible to arrange the detector units like a matrix in rows and columns. The counters can be read out serially or parallel. The counter values can be processed in the calculation unit. A circuit in the controlling unit guarantees that the counters are able to count in a defined temporal manner or that counting is inhibited at well defined times.

One advantage of the use of several detector units is that with a small active area of the single detector units very high particle flux densities can be processed. This leads to a high upper limit of the measuring range concerning particle flux density and therefore concerning dose values. With the use of several detector units at a given active area of the whole arrangement the losses of counts through temporal overlapping of pulses produced in the detector unit is decreased, because the individual rate of one detector unit is smaller than the whole rate of the incident particles. The possibility of measuring energy spectra in the direct beam of for example medical installations without decreasing particle flux for the measurement is opened through the use of a plurality of detector units and through the property of the detector units to count particles with energy deposition in intervals defined by discriminator thresholds. In the future, pixelated, counting semiconductor detectors will be used as imaging detectors in medical diagnostics. In the future, it will be possible to determine the applied dose values directly with the imaging detector. The measures we have invented are applicable for dose calculations with the signals of these imaging detectors themselves. Today these imaging detectors only reach active areas of some square centimeters. Thus it is reasonable to design dedicated apparatuses with pixelated detectors for the determination of energy information or dose values on a short or mid term scale in order to improve dose estimation precision and sensitivity or to facilitate the measurement of energy information.

The sensor material may also be a scintillator with high detection efficiency in the relevant energy range. The sensors of the detector units should be optically separated and are coupled to optically sensitive semiconductor electronic elements working as the above mentioned converter. The discriminator- and counter-logic can be realized as integrated circuits. Concerning the reachable accuracy, compactness, measuring range and sensitivity the use of a pixelated counting semiconductor detector has some advantages. There is an advantage with respect to the needed development time, because there is one such detector already available which can be used in apparatus for determination of energy information or dose values. This detector consists of the Medipix2 chip combined with a sensor layer of silicon, GaAs or Cd(Zn)Te. If a thick sensor layer or semiconductor material of high effective charge of the nuclei is used, the efficiency for photons is very high for low energetic photons. Due to the small size such detector can easily be used in a personal dosimeter. The pixelated counting semiconductor detector suffers from an effect called charge sharing especially at small detector unit sizes. The small detector unit sizes are the basis for a high upper threshold for measurements concerning particle flux density. In the effect of charge sharing, the electron/hole distribution released by an incident particle in the sensor layer is registered sometimes by more than one detector unit. A major source for this effect is the broadening of the drifting distribution in all directions due to diffusion. This broadening results sometimes in signals above the thresholds in the converters of more than one pixel. Thus one particle is sometimes counted in more than one detector unit. Also the energy deposition is sometimes distributed over several detector units. Thus the energy deposition value in one detector unit does not reflect the total energy deposited. In the case of the use of scintillator materials as sensors, the optical cross talk between adjacent detector units causes the similar problems.

Therefore the method for the determination of energy information or dose values should correct the effect of charge sharing or optical cross talk in order to increase the precision. We invented a method which corrects the influence of those effects. The basic idea of this method is to regard the measured deposition spectrum as linear combination of deposition spectra caused by the incidence of several monoenergetic irradiations. We label the measured deposition spectrum in its discrete form as $N_{i,i+1}$. $N_{i,i+1}$ is the number of counted events with energy deposition in the interval $[E_i; E_{i+1}]$, with $E_i < E_{i+1}$.

The deposition spectrum of monoenergetic irradiation of the energy $E_j^{mono}$ shall be labeled as $M_{ij}$. $M_{ij}$ is a series in i. The energy deposition spectrum $M_{ij}$ is normalized through a division by the number of particles used in the simulation or the measurement under monoenergetic irradiation. The index i describes the position in the deposition spectrum. The index j is an index of the primary energy $E_j^{mono}$. $M_{ij}$ is the probability that an incident particle of energy $E_j^{mono}$ leads to a count of an event in the deposition interval $[E_i; E_{i+1}]$. If there are $i_{max}$ intervals of the energy deposition, there should be at minimum the same number of different deposition spectra be measured or simulated, whereas preferably for each interval there is at minimum one primary energy $E_j^{mono}$ lying in the interval. There are $j_{max}$ deposition spectra measured or simulated. If $i_{max} = j_{max}$, the primary energy $E_i^{mono}$ can be chosen as $(E_{i+1}+E_i)/2$ for all i. $E_i^{mono}$ can also be chosen as the weighted mean value of the expected energy distribution of the incident radiation in the interval $[E_i; E_{i+1}]$ with the detection efficiency in this interval. The measured deposition spectrum $N_{i,i+1}$ of the radiation whose properties are to be determined with the apparatus can be written as:

$$N_{i,i+1} = \sum_{j=1}^{j_{max}} M_{ij} \cdot \tilde{N}_j.$$

The series $\tilde{N}_j$ is an approximation of the wanted spectrum of the incident particle energies. This means that $\tilde{N}_j$ is the number of particles that impinged with an energy near to $E_j^{mono}$ onto the sensor. The series $\tilde{N}_j$ is the wanted energy spectrum of the incident radiation in a discrete form. The detection efficiency is already included in $M_{ij}$ through the determination of $M_{ij}$ and therefore $\tilde{N}_j$ is already corrected for eventually incomplete detection efficiency. $N_{i,i+1}$ as a series in i and $\tilde{N}_j$ as a series in j can be seen as components of a vector $\overline{N}$ and respectively $\overline{\tilde{N}}$ and the $M_{ij}$ are seen as components of a matrix $\hat{M}$, it can be written: $\overline{N} = \hat{M} \cdot \overline{\tilde{N}}$. The vector $\overline{\tilde{N}}$ is the wanted energy spectrum of the incident radiation in its discrete form and can be calculated through a matrix inversion or through estimation methods like the Maximum-Likelihood-Method. So the energy spectrum of the incident radiation is determined. The influences of effects like the charge-sharing-effect or optical cross-talk onto the reconstructed energy spectrum is corrected with the use of this reconstruction algorithm. The task of the invention to determine the energy spectrum of incident radiation is therefore solved and the energy spectrum is estimated with sufficient precision.

Another method to reconstruct the incident energy spectrum is to multiply first the number of counts in the highest bin j of the deposition spectrum with the normalized response function of the corresponding energy $E_j^{mono}$. The response function of an energy in the bin j contributes to the wanted energy spectrum with the number of counts in bin j. The value of the multiplied response function of $E_j^{mono}$ in a Bin i is then subtracted from the number of counts in Bin i. This subtraction is carried out for all i<j. Thus, after the subtraction, the counts in bin (j−1) coming from particles of an energy of higher bins are eliminated. The response function onto the energy of the bin (j−1) contributes then with the result of the subtraction in this bin (j−1). The response function onto the energy of bin (j−1) is then multiplied with the result of this subtraction. The value of this multiplied response function is subtracted from the already corrected counts in all bins i<(j−1) resulting in the contribution of the energy $E_{j-2}^{mono}$. This procedure is carried out successively again and again. In each step of this process, the remaining number of counts in the bins decreases. In the end, the contributions of all response functions and so the energy spectrum is determined.

The dose D, deposited in a material like for example air or tissue, can be calculated from the determined spectrum $\tilde{N}_j$ of the incident particle energies if factors $K_j$ are determined earlier by measurements or simulations. The factors can be determined using the energies $E_j^{mono}$ in simulation or measurement. The dose is the addition of the dose contributions of the energy intervals in the spectrum:

$$D = \sum_{i=1}^{i_{max}} K_i \cdot \tilde{N}_i$$

Dose rate values can be determined through a division of the measuring time, also determined by the apparatus. The task of determining dose values with sufficient precision is therefore solved.

It is also possible to directly determine dose values without prior determination of the deposition spectrum. In this method, the number of counts in each bin of the deposition spectrum $N_{j,j+1}$ is multiplied by a factor $L_j$. The factors $L_j$ are determined prior to the measurement through simulations or measurements using an estimation of the form of the wanted energy spectrum. Preferably the form of the spectrum in the measurement or simulation is similar or equal to the form of the wanted energy spectrum. The dose is determined by $$D = \sum_{i=1}^{i_{max}} L_i \cdot N_{i,i+1}.$$

This method is an estimation of the dose value and not as precise as the method mentioned above. The information in the deposition spectrum, for example the maximum particle energy, can be used to determine some factors $\tilde{L}_m$ being more exact from the $L_i$. The dose would be $$D = \sum_{m=1}^{m_{max}} \tilde{L}_m \cdot N_{m,m+1}.$$

It is possible to increase the precision of the determination of dose values or energy information. To do this, the energy spectrum is sampled with larger intervals first. Then, the thresholds of the discriminators are calculated and then applied in a way that the energy spectrum is sampled in a more detailed manner with energy intervals lying in the relevant energy region. So it is possible to obtain a higher accuracy for unknown spectra.

It is possible to use the arrangement without the placement of absorbers between the sensors and the radiation source. In order to enlarge the energetic measuring range, to enlarge the dynamical range concerning particle flux density, to determine energy spectra or dose contributions from different types of particles or to measure the mean angle of incidence it is possible to place one or several absorbers between the sensors and the incident radiation on several places of the arrangement. In the following we explain some methods with different discriminator threshold adjustment strategies and methods of count analysis separately for use with absorbers and without absorbers.

Methods and Apparatuses without Using Absorbers

In an easy form of embodiment, each detector unit has a discriminator with an adjustable threshold and a counter which counts pulses if they overstep the threshold.

There are two adjustment strategies for the discriminator thresholds in the arrangement imaginable. First, all detector units can work with the same height of the discriminator threshold. Second, groups of detector units can be formed where detector units of one group have the same discriminator threshold but different groups have different thresholds.

Uniform Threshold for all Detector Units in the Arrangement

The threshold is first set to a value as low as reasonable. Orientation for this value can be found in the energy spectrum of the incident radiation. To obtain the deposition spectrum, the events over the threshold are counted with all detector units for a certain time. After this time all counters are read out and the all counter values are summed in the calculation unit. Thus one obtains $N_1$. The discriminator threshold is then increased for all detector units. For a new measuring time, all detector units count the events over the new threshold. Reading out all counters and summing the counter values gives $N_2$. The thresholds are increased in steps by $\Delta E$ up to the highest reasonable value, depending on the incident radiation. After each step, the counters determine the number of events over the threshold and are then read out and the counts are summed up. If the sum $N_{i+1}$ of the values of all detector units at a certain discriminator threshold $E_{i+1}$ is subtracted from the sum $N_i$ of the values at the previous, next lower, threshold $E_i$, one obtains the number of events with energy deposition in the interval $[E_i; E_{i+1}]$. With this method, which uses the scan method, one can use the measures above in order to reconstruct the spectrum of incident particle energies or in order to determine dose values. If the detector units have the ability to count events in energy deposition windows, a similar method can be applied. In this method, the windows are varied in the energy spectrum, for example in the width of the interval is fixed but the lower interval edge is varied, like it is described for the variation of one threshold.

The maximum energy in the spectrum, which corresponds for example in X-ray arrangements to the maximum tube voltage, can easily be extracted from the measured deposition spectrum. The maximum energy is estimated by the mean value of the interval edges $E_l$, $E_{l+1}$ of the highest interval which shows a number of counts $N_{l,l+1}$ significantly differing from zero.

Figure 5:
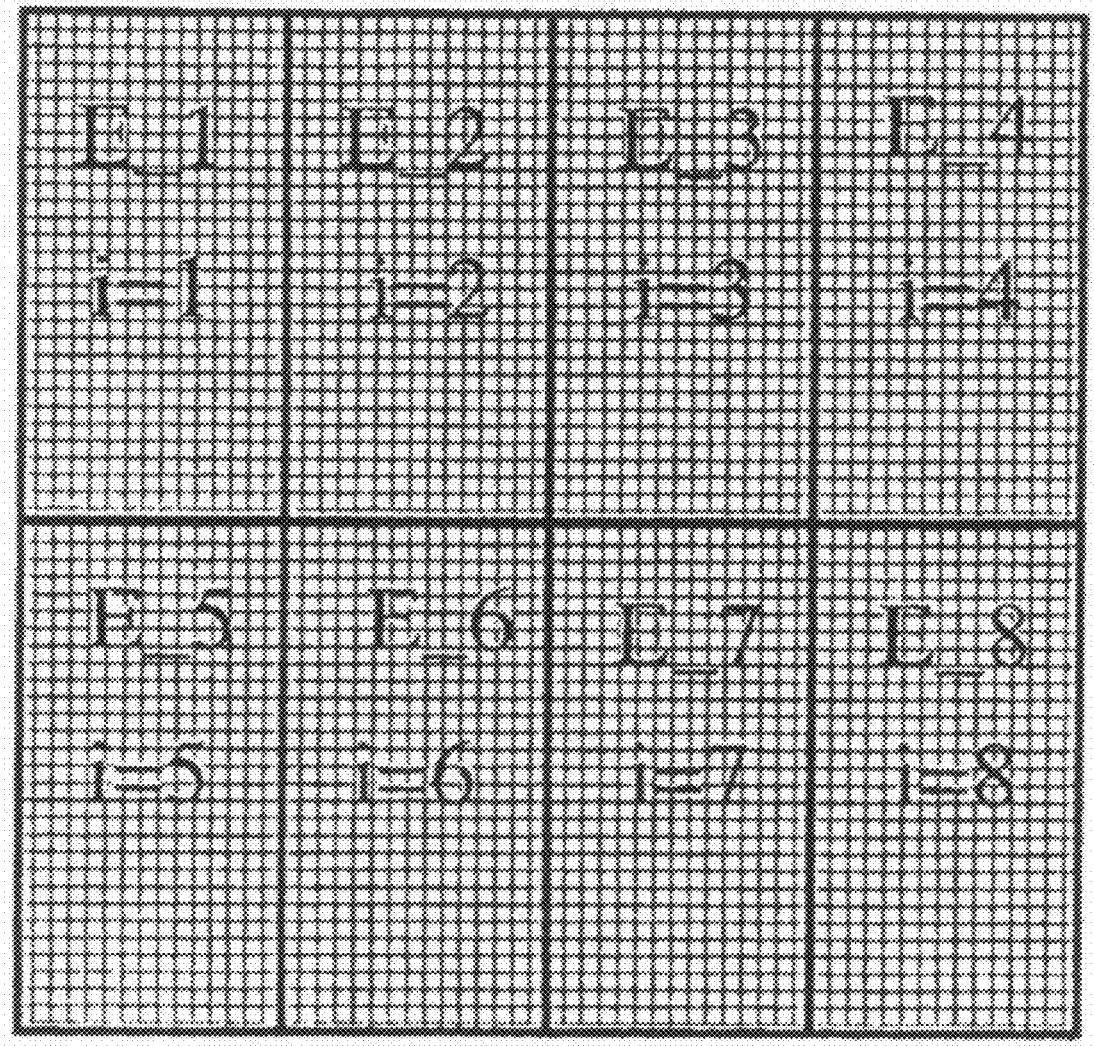
FIG. 5 is an example of an arrangement of 8 energy deposition thresholds in an array of detector units.

Using Different Groups of Detector Units with Uniform Thresholds in Each Group but Different Thresholds Between the Groups Using this threshold adjustment strategy one sets a uniform threshold in each group of detector units and sets different thresholds in different groups. The thresholds do not vary over time. A group can be formed by a contiguous area of detector units. The selection of such a group (positions, area, and threshold) depends on the type of the detector units, type and energy of the particles, the geometrical set up of the whole arrangement and the read out principle of the counters. FIG. 5 shows an example of an arrangement of 8 energy deposition thresholds in an array of detector units where the discriminators work in the exceeding-method. FIG. 6 shows another example of an arrangement of energy deposition thresholds in an array of detector units where the discriminators work in the window-method. Although the energy ranges are represented as contiguous (i.e. the upper threshold of a range is equal to the lower threshold of the next energy range), this is not a necessary condition. The energy ranges don't need to be of equal width either, and may be selected for optimizing the measurements.

Using this strategy it is possible to measure the number of events in all deposition intervals simultaneously. After the read out of the counters, the events counted in the group are summed up for all areas separately. If in a group the threshold $E_i$ is applied, the result of the summation is $N_i$ in the exceeding-method, giving the number of events with energy deposition greater than $E_i$. The group with the threshold $E_{i+1}$ gives the number $N_{i+1}$. It is assumed that there is no interval with a threshold $E_2$ with $E_i < E_2 < E_{i+1}$. The number of events with energy deposition in the interval $[E_i; E_{i+1}]$ is: $N_{i,i+1} = N_i - N_{i+1}$. The deposition spectrum is measured in all its bins simultaneously through such a distribution of thresholds over the arrangement of counting detector units. The energy spectrum of incident radiation can be reconstructed and dose values can be calculated using the methods described above. If the detector units have discriminator units which are able to count events with energy deposition in intervals, a similar method is applicable. In a group formed by a group of detectors, a specific energy deposition window is selected and different areas have different windows. The maximum energy in the spectrum, which corresponds for example in X-ray arrangements to the maximum tube voltage can easily be extracted from the measured deposition spectrum. The maximum energy is estimated by the mean value of the interval edges $E_l$, $E_{l+1}$ of the group with highest interval edges which shows a number of counts $N_{l,l+1}$ significantly differing from zero.

It is not necessary that the groups consist of the same number of detector units. Preferably the areas of the groups are adapted to the working principle of the discriminator (exceeding- or window method). To use the area of the whole arrangement in the best way concerning a minimal statistical error it can be better to use different numbers of detector units in different groups. This takes into account that the detection efficiency normally varies with the energy of the incident particle and secures that the maximum counter values are not reached between two read outs of the counters. The detection efficiency dependence on energy and the expected spectral distribution of energies should be taken into account in the choice of the areas of the groups. If an arrangement of semiconductor detector units is used, preferably the group with higher thresholds comprises more detector units than the groups with lower thresholds.

Methods and Apparatuses Using Absorbers

The placement of absorbers above an arrangement of counting detector units can be used as a separate method or in combination with the methods described above, which do not need absorbers. The combination of the placement of absorbers with the methods described above using variations of thresholds or windows over space or time offer the possibility of improving the systematic precision, the extension of measuring ranges or of determining the energy spectra or dose value contribution for different types of particles. Under certain circumstances the use of absorbers may lead to increases in the statistical errors for a fixed area and measuring time of the whole arrangement. The placement of absorbers is easily possible in an arrangement of a multitude of detector units because the arrangement can be built laminar.

The low energetic part of the spectrum is attenuated stronger than the high energetic part of the spectrum. Incident particles lose a certain amount of energy in the absorber, depending onto the absorber material, absorber thickness, particle type, energy and angle of incidence. The radiation field is changed in a characteristic manner by the absorber. The effect of absorbers on the radiation can be measured or simulated using programs like the package ROSI [4]. It is possible to absorb for example particles with low range, for example alpha- or beta-particles, through a certain choice of absorber material with sufficient thickness. So the detector units behind this absorber do not register dose value contributions for these particles. Thus it is possible to determine dose contributions of certain particle types separately. Dose values of the mixed radiation field are determined by summing the dose contributions of all relevant particle types.

In one possible form of embodiment, several laminar plates of absorbers consisting of different materials and thickness are placed over the arrangement of a multitude of counting detector units where the detector units behind each absorber form different groups with uniform discriminator thresholds in each group. Therefore it is possible to measure the deposition spectrum behind the absorbers in all energy bins simultaneously. It is also possible to place several laminar absorber plates of different materials and different thicknesses above the arrangement of the multitude of counting detector units and to use the discriminators of all detector units behind one absorber with the same threshold. Using the scan-method with varying the thresholds behind one absorber or behind all absorbers simultaneously the deposition spectrum behind each absorber can be determined.

The energy spectrum behind an absorber can be reconstructed with the methods described above using the number of counts in each energy deposition bin. With knowledge of the radiation that was able to pass the absorber, it is possible to calculate the incident spectrum because it is possible to determine the influence of the absorbers onto known spectra through measurements or simulations. Those simulated or measured spectra under knowledge of the incident spectra can be compared to the measured reconstructed spectrum behind the absorber and so the incident spectrum can be determined. The use of several different absorbers improves the quality of such a calculation. Additionally a measure for estimation of dose values using absorbers above the arrangement is possible. All detector units behind each absorber are operated with one threshold value which is not varied over time. The calculation unit sums the counter values of all detector units behind all absorbers separately. For absorber k the number of events registered from all detector units behind absorber k is $N_k^{Absorber}$. For all $k_{max}$ absorbers, this number is determined. This number is proportional to the particle flux density passing the absorber and therefore for a fixed form of the incident spectrum and fixed particle types and fixed angle of incidence, proportional to the exposure of the incident radiation. Dose values D of the radiation impinging onto the whole arrangement can be estimated using certain factors $K_k$. These factors are determined before the measurement through simulations or measurements with incidence of a spectrum similar to the spectrum whose properties should be measured.

It is:

$$D = \sum_{k=1}^{k_{max}} K_k \cdot N_k^{Absorber}.$$

It is also possible to apply methods, which are used in a similar form to determine dose values from film dosemeters, to determine particle type, energy spectrum and dose values. To transfer their principle to an arrangement of a multitude of counting detectors, one has to see the number of counted events in detector units behind an absorber as the blackening of a film behind the absorber. The dependencies of the counted events from particle type, particle energy absorber (analog to blackening), which are needed for the analysis, have to be determined via simulations or measurements under irradiation with known radiation. The use of an arrangement of a multitude of counting detector units avoids the problems of film dosimeters arising from their saturation of blackening and blurring. It is also possible to determine the mean angle of incidence with an arrangement of a multitude of counting detector units through the placement of an absorber above the arrangement. To determine this angle, the events in the detector units under the edge of the absorber have to be examined. The absorber has preferentially a cylindrical shape. Corrections onto the dose values due to deviations from perpendicular incidence can be performed with known dependence of detection efficiency or energy deposition to the angle of incidence.

Methods and Apparatuses with One Single Counting Detector Unit

If only one detector unit is used in the arrangement, the measures without using absorbers explained above are also applicable. To determine the deposition spectrum, the detector units has to be operated with a varying threshold or window in time (scan-method) or to be operated with several differing thresholds or windows simultaneously or to be operated with a multi channel analyzer. The measures for determination of the energy spectrum or dose values of incident radiation can be applied as described above.

Example of Embodiment

As an example embodiment, we use the combination of the Medipix2 chip and a sensor layer of silicon of 700 μm thickness. The active area of a combination of the Medipix2 chip and the sensor layer has a quadratic form with a side length of around 14 mm. The Medipix2 chip consists of 256 times 256 electronic cells with included discriminator- and counter electronic. The sensor layer has 256 times 256 electrodes (transformer) on the side which is contacted via Bump-Bonds with the Medipix2 chip. The distance between two bump bonds is 55 μm. The electrode on the opposite side is realized as a continuous electrode. To obtain an electric field, a voltage of around 250 V is supplied to the electrodes of the sensor layer. This tension is supplied by the electric power supply unit 6. FIG. 2 shows a schematic view of the pixelated detector which is an arrangement of a multitude of counting detector units if one considers the combination of an electronic cell of the Medipix2 chip and the sensor volume above the transformer electrode as one single detector unit. FIG. 3 is a picture of the Medipix2 sensor combination and shows that the whole arrangement has a very compact design. Such a combination enables the design of a very compact dosimeter.

If a photon or an electron deposits energy in the sensor, a multitude of electrons and holes are produced and separated from each other by the applied drift field. The electrons or the holes are drifting towards the electrodes on the side of sensor which is contacted via the bump bonds to the Medipix2 chip. An electric current is flowing into the input electrodes of the Medipix2 chip pixel-electronics. The pulse is integrated and compared to an adjustable threshold $V_{thr,low}$. If the pulse oversteps the threshold, the counter of the detector unit electronic is incremented. The counter is able to count at maximum 8000 events between two readout cycles. The electronic cell of the Medipix2 chip has the possibility to apply additionally an upper threshold $V_{thr,high}$. If the condition $V_{thr,low} < V_{thr,high}$ is satisfied the counter registers the events which deposit an energy between the corresponding thresholds $V_{thr,low}$ and $V_{thr,high}$. This means that in this case the detector unit is operated in the window-method. The energy precision is around 1 keV.

A detector unit is formed by one of the 256 times 256 cells of the Medipix2-electronics, the bump-bond-ball and the sensor volume between the electrode connected to the bump-bond-ball and the upper side of the sensor layer. In this example embodiment, the arrangement of counting detector units is formed by 256 times 256 detector units. FIG. 1 shows the principle setup of the whole arrangement for measurements of energy information or dose values of incident radiation in a compact apparatus. In a housing 8, for example made from plastics, are arranged and electrically connected: an array of counting detector units 1 for example realized as combination of Medipix2 chip and a sensor layer of silicon, a calculation unit 2, a transmission unit 3, a memory unit 4, a control unit 5, a power supply unit 6 and a display 7. The display 7 can for example be realized as a LCD-Monitor or LCD-Display and can display information about the status of the system, the energy information or dose values.

The relationship between the electric tensions, which are applied as thresholds at the discriminators of the Medipix2 chip, and the corresponding energy depositions can easily be determined for example through a calibration with radioactive sources. In the following, threshold voltages can alternatively be seen as energy deposition values. As an example the detector units of the arrangement are divided in 8 groups whereby all detector units in one group are operated with the same threshold adjustment values. It is possible to choose a smaller number of groups. Exemplarily we explain the adjustment measures for 8 groups. First we describe a strategy for adjusting the thresholds of the discriminators of the Medipix2 chip, where all discriminators work in the exceeding-method. The Medipix2 chip allows the adjustment of at maximum 8 different threshold values for the lower threshold in arbitrary geometrical distribution over the detector units of the chip. The 8 groups of detector units are chosen. Each group is identified definitely by one full number i between 1 and 8. The energy range $[E_1; E_8]$ in which energy information or dose values shall be determined, has to be defined. This energy range can start with the minimal possible threshold value above the noise of the electronics. In this example one can choose 4 keV as minimum threshold value. The upper threshold value can be the highest energy in the spectrum of the incident radiation. If radiation from an X-Ray tube is examined, this maximum value corresponds to the tube voltage multiplied by the charge of an electron.

Figure 4:
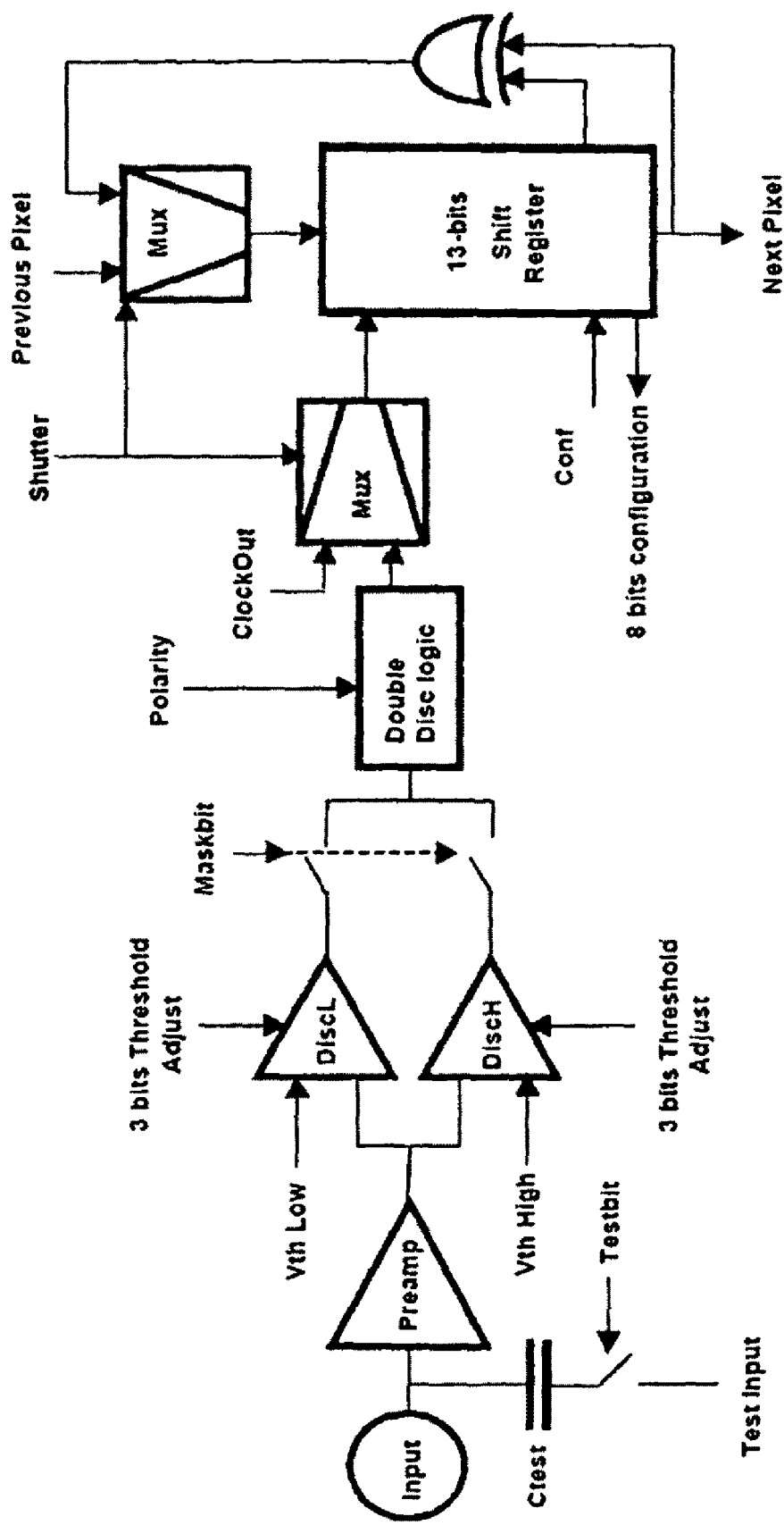
FIG. 4 is a block diagram of a detector unit that can be used in the invention.

The voltage $V_{thr,low}$, defining the lowest lower threshold, is set to $E_1$. The voltage $V_{THS}$, which can be set for the Medipix2, is set to $(E_8-E_1)$. For each detector unit of a group i, the full number i in binary coding, is used to set the values of the 3 Threshold Adjust Bits of the lower threshold (named as "3 bits low threshold" in FIG. 4). The electronics of the discriminator therefore operates with the lower threshold $E_i = E_1 + (i-1) \cdot V_{THS}/7$. The same value of i is set in all detector units of a group. The group with the threshold $E_8$ counts in this example all events with an energy deposition greater than $E_8$. It is therefore possible to get 7 energy deposition intervals with defined edges in this example. FIG. 5 shows exemplarily a possible distribution of the lower thresholds on the Medipix2 chip. The groups do not need to be formed by the same number of detectors. They do not need to be rectangular. It may lead to advantages, for example a lower statistical error, if the groups with higher thresholds are formed by more detector units than the groups with lower thresholds. To obtain the deposition spectrum as a series of counts in the deposition intervals $[E_i; E_{i+1}]$, all counts of the detector units in one group are summed separately for each group. This is done for all groups. In group i the result of this summation is $N_i$ and in group i+1 it is $N_{i+1}$. The number events with energy deposition in the interval $[E_i; E_{i+1}]$ is then $N_{i,i+1} = N_i - N_{i+1}$. If this is done for all i up to 7 we obtain the energy deposition spectrum as the series $N_{i,i+1}$. $N_8$ is the number of events with an energy deposition above $E_8$ Now we describe a different adjustment strategy of discriminator thresholds of the Medipix2 chip whereby all detector units are operated in the window method. The Medipix2 chip supports the simultaneous operation of 8 different lower and upper threshold values in arbitrary geometric distribution over the arrangement of detector units. The 8 groups of detector units are chosen. Each group is identified definitely by one full number i between 1 and 8. The energy range $[E_1; E_9]$ in which energy information or dose values shall be determined, has to be defined. This energy range can start with the minimal possible threshold value above the noise of the electronics. In this example one can choose 4 keV as minimum threshold value. The upper threshold value can be the highest energy in the spectrum of the incident radiation. If radiation from an X-ray tube is examined, this maximum value corresponds to the tube voltage multiplied by the charge of an electron.

The voltage $V_{thr,low}$, defining the lowest lower threshold, is set to $E_1$. The voltage $V_{THS}$, which can be set for the Medipix2, is set to $(E_8-E_1)$. For each detector unit of a group i, the full number i in binary coding, is used to set the values of the 3 Threshold Adjust Bits of the lower threshold (named as "3 bits low threshold" in FIG. 4). The electronics of the discriminator therefore operates with the lower threshold $E_i=E_1+(i-1)\cdot V_{THS}/7$. The same value of i is set in all detector units of a group. Additionally the threshold $V_{thr,high}$, defining the lowest upper threshold value, is set to $V_{thr,low}+V_{THS}/7$. For each detector unit of a group i, the full number i in binary coding, is used to set the values of the 3 Threshold Adjust Bits of the upper threshold (named as "3 bits high threshold" in FIG. 4). The electronics of the discriminator therefore operates in the window method with the lower threshold $E_i=E_1+(i-1)\cdot V_{THS}/7$ and upper threshold $E_{i+1}=E_1+i\cdot V_{THS}/7$. Therefore we have 8 energy intervals defined over the arrangement of detector units. The measuring interval $[E_1;E_9]$ is divided into 8 non-overlapping intervals connected to each other. To obtain the deposition spectrum, the number of events registered in all counters of each group is summed up independently for all groups. In group i we get $N_{i,i+1}$ as the number of events with energy deposition in the interval $[E_i;E_{i+1}]$. Thus we obtain the energy deposition spectrum as the series $N_{i,i+1}$ in i. FIG. 6 shows exemplarily a possible choice of the groups, described by the number i, the lower and the upper threshold value. The groups do not need to be formed by the same number of detectors. They do not need to be rectangular. It may lead to advantages, for example a lower statistical error, if the groups with higher thresholds are formed by more detector units than the groups with lower thresholds.

Figure 8:
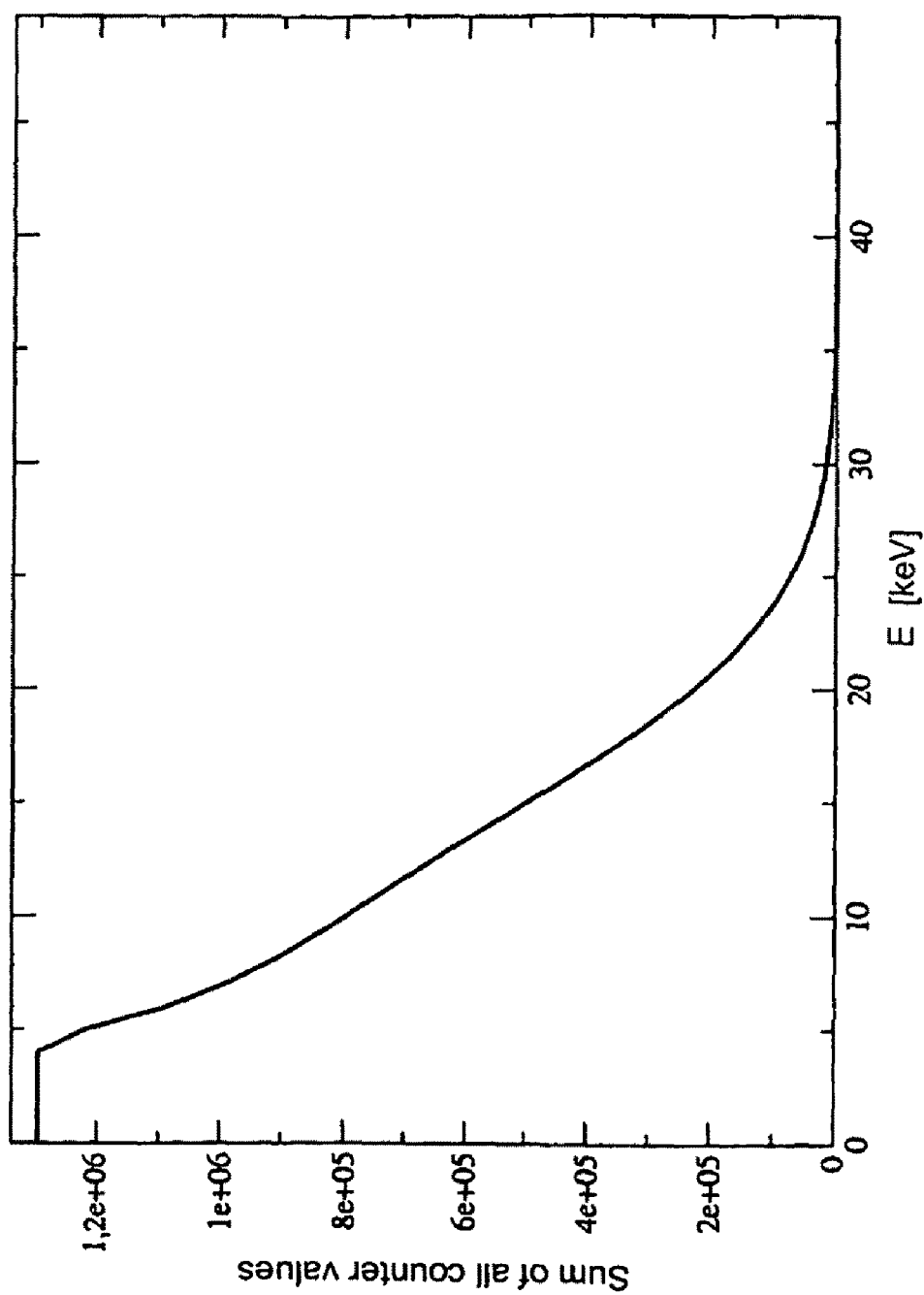
FIG. 8 shows the number of counts above a series of energy deposition thresholds measured with the scan method with the Medipix2 chip-sensor apparatus, under irradiation with photons from a X-ray tube with tungsten anode at a voltage of 40 kV.
Figure 9:
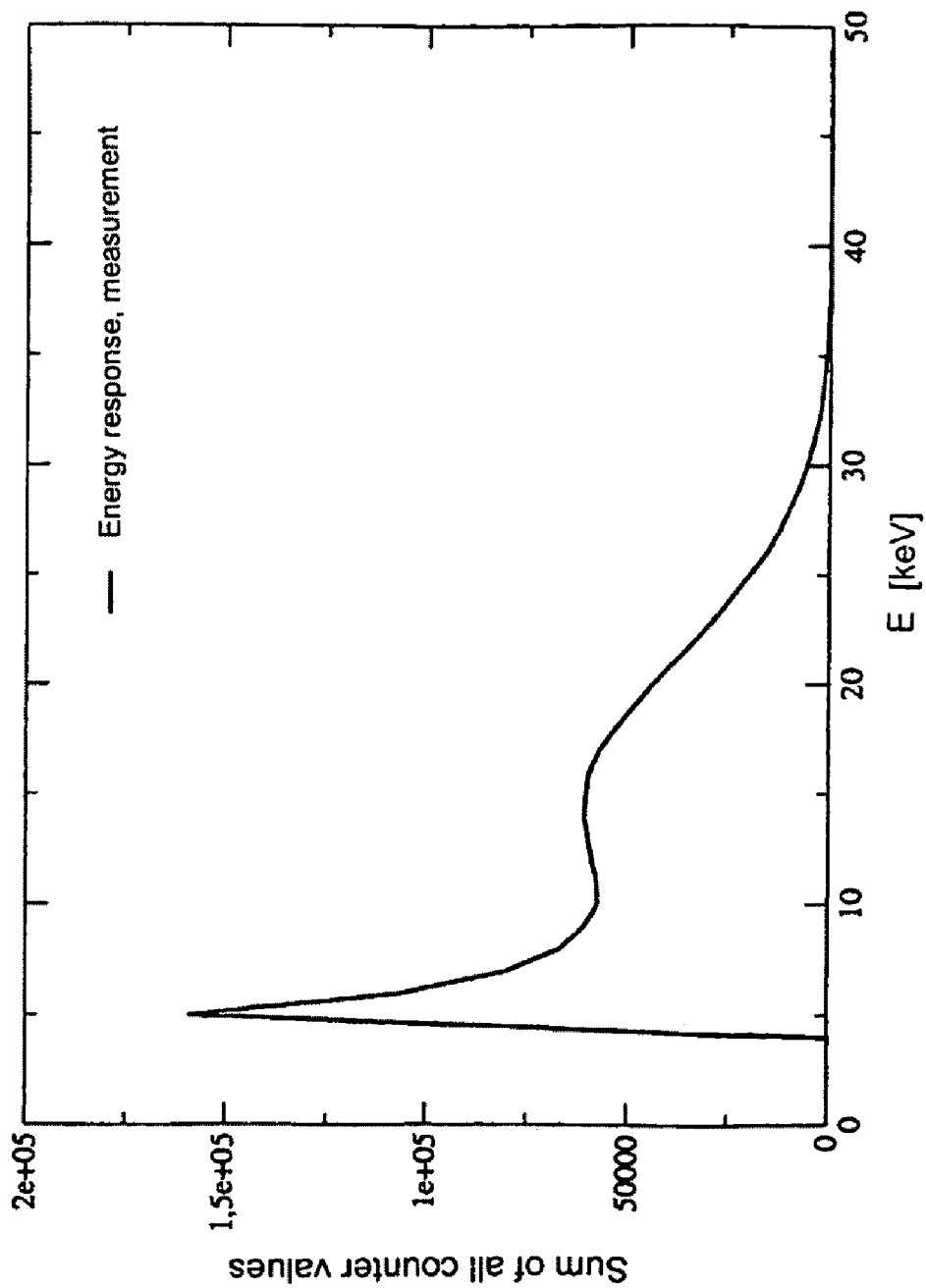
FIG. 9 shows the deposition spectrum derived from a measurement with the scan method under irradiation with photons from a X-ray tube with tungsten anode at a voltage of 40 kV.
Figure 10:
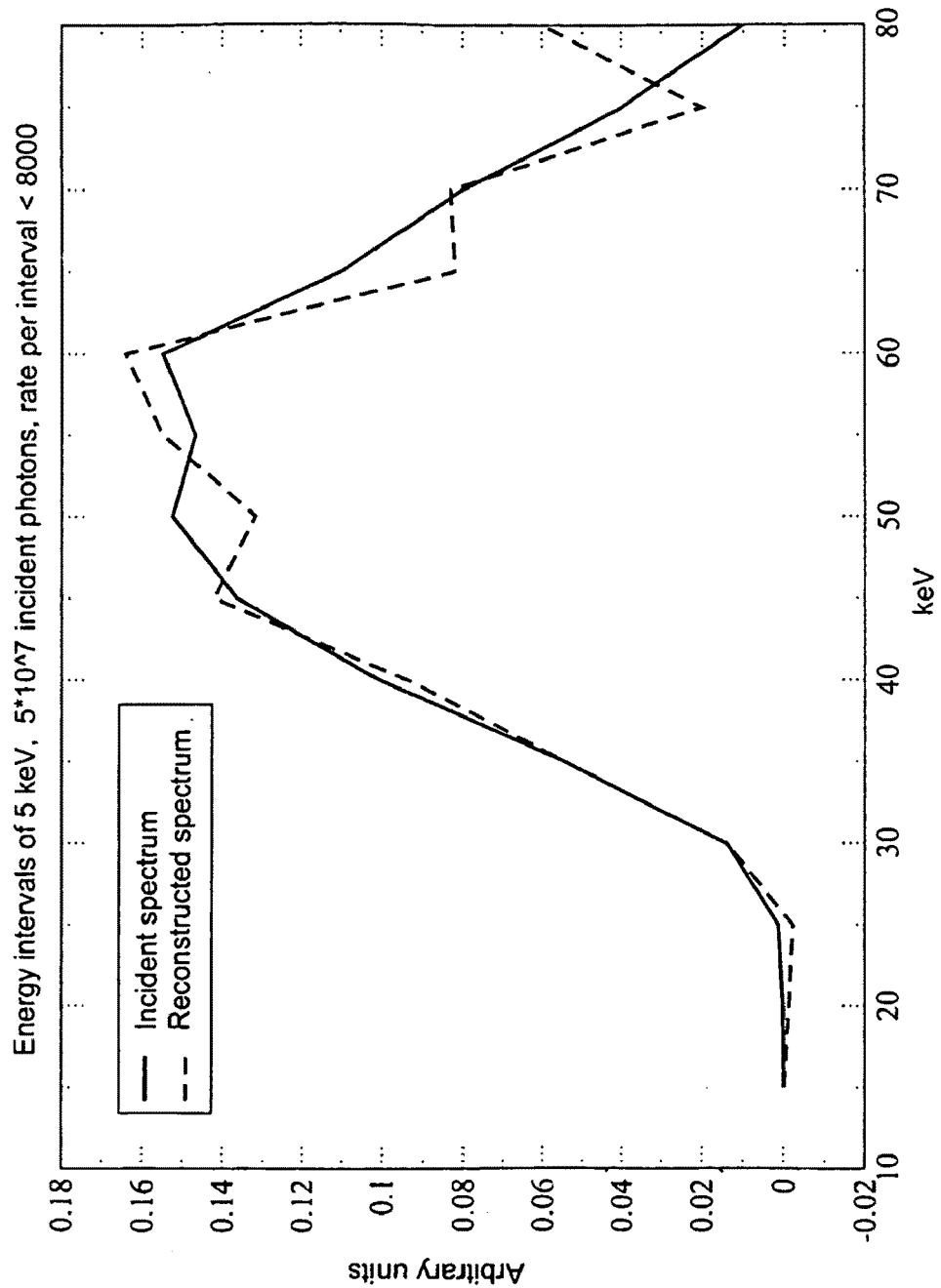
FIG. 10 shows the incident and reconstructed energy spectrum from a simulation with an incident X-ray spectrum from a tube with 80 kV voltage and a tungsten anode.

It is also possible to use the scan-method with this example embodiment. In this method, the threshold values are set equally for all detector units and are increased step by step. The counters are read out between two steps. All counter values which are read out are summed up for all read cycles separately. FIG. 8 shows exemplarily the dependence between the summed counter values and the threshold value for this read out cycle if the arrangement is irradiated with X-rays from a tungsten tube. If the difference between the summed counter values for one threshold value and the summed counter values for the next higher threshold value is calculated, the deposition spectrum is obtained. FIG. 9 shows the deposition spectrum calculated from FIG. 8.

Figure 11:
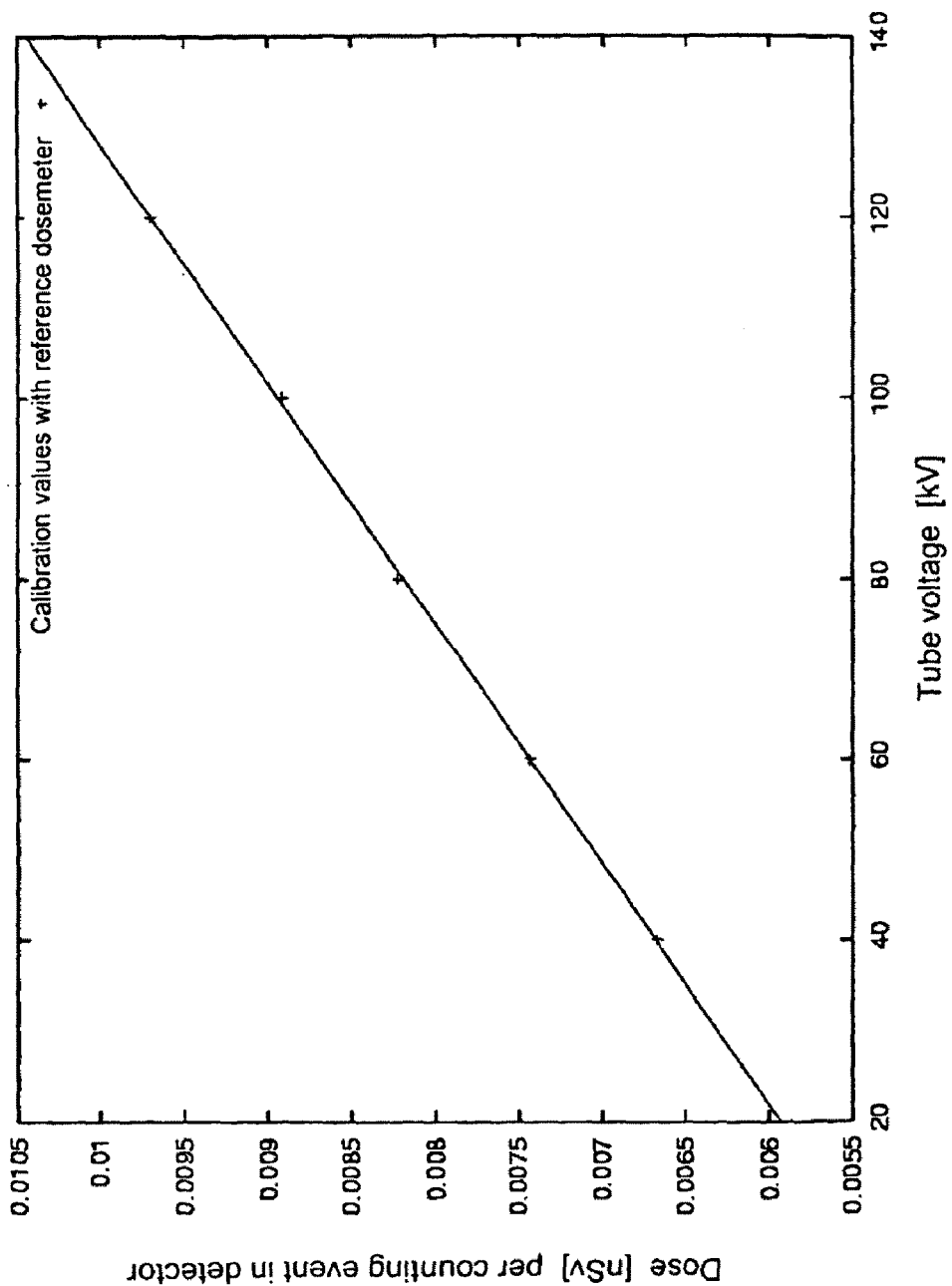
FIG. 11 shows a calibration of the summed number of counts of all detector units measured with the embodiment example and a dosimeter as reference under irradiation with an X-ray source with tungsten anode at various tube voltages.

Now a method for determining the dose is described for the embodiment example. This measure is described above in a more general manner. The arrangement is irradiated with X-rays from a tungsten tube. The lower threshold is set to 4 keV for all detector units. All detector units are operated in the exceeding-method. Let A denote the number of detector units. To calibrate the dosemeter formed by the arrangement, the dependence of the summed counter values $N_{total}$ of the whole arrangement in comparison to the dose $D_{reference}$ registered by a dosemeter as reference is measured for different tube voltages. Both are located in the direct beam of the radiation source. For this calibration the tube voltages of 40 kV, 60 kV, 80 kV, 100 kV, 120 kV are used. The division $D_{reference}/N_{total}$ gives the factor L, mentioned above, in dependence onto the tube voltage and therefore in dependence of the maximum particle energy. FIG. 11 shows the measured dependence. An analytical function is fitted to these values via mathematical standard measures. Using this function it is possible to calculate the factor L with high precision for any known voltage of the tube for the given anode material. A linear regression of the data in FIG. 11 leads to $L[nSv]=3.76\cdot 10^{-5}\cdot U[kV]+5.17\cdot 10^{-3}[nSv]$. The dose can then be determined with the arrangement without further use of the reference dosemeter and without knowledge of the tube voltage through multiplication of the measured $N_{total}$ with the mean values of L in this energy range. With the assumption that the tube voltage is ranging between 40 kV and 120 kV in this example, a precision of the determined dose value between −15% up to +23% is reached.

Figure 13:
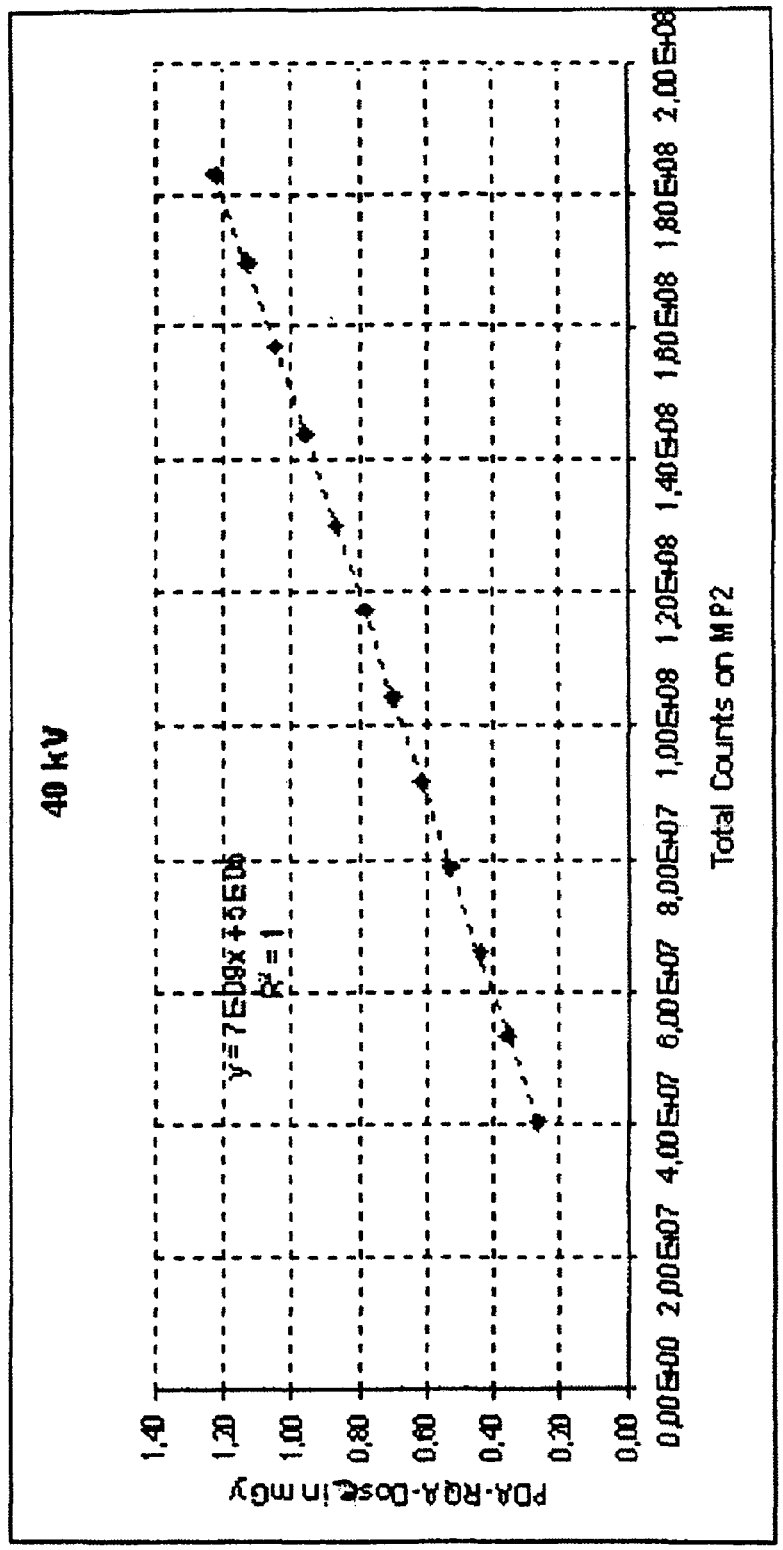
FIG. 13 Measuring values of a dosimeter used as reference in dependency of the summed number of counts of all detector units of a Medipix2 chip-sensor combination under irradiation with X-rays from a tungsten tube at a tube voltage of 40 kV.
Figure 14:
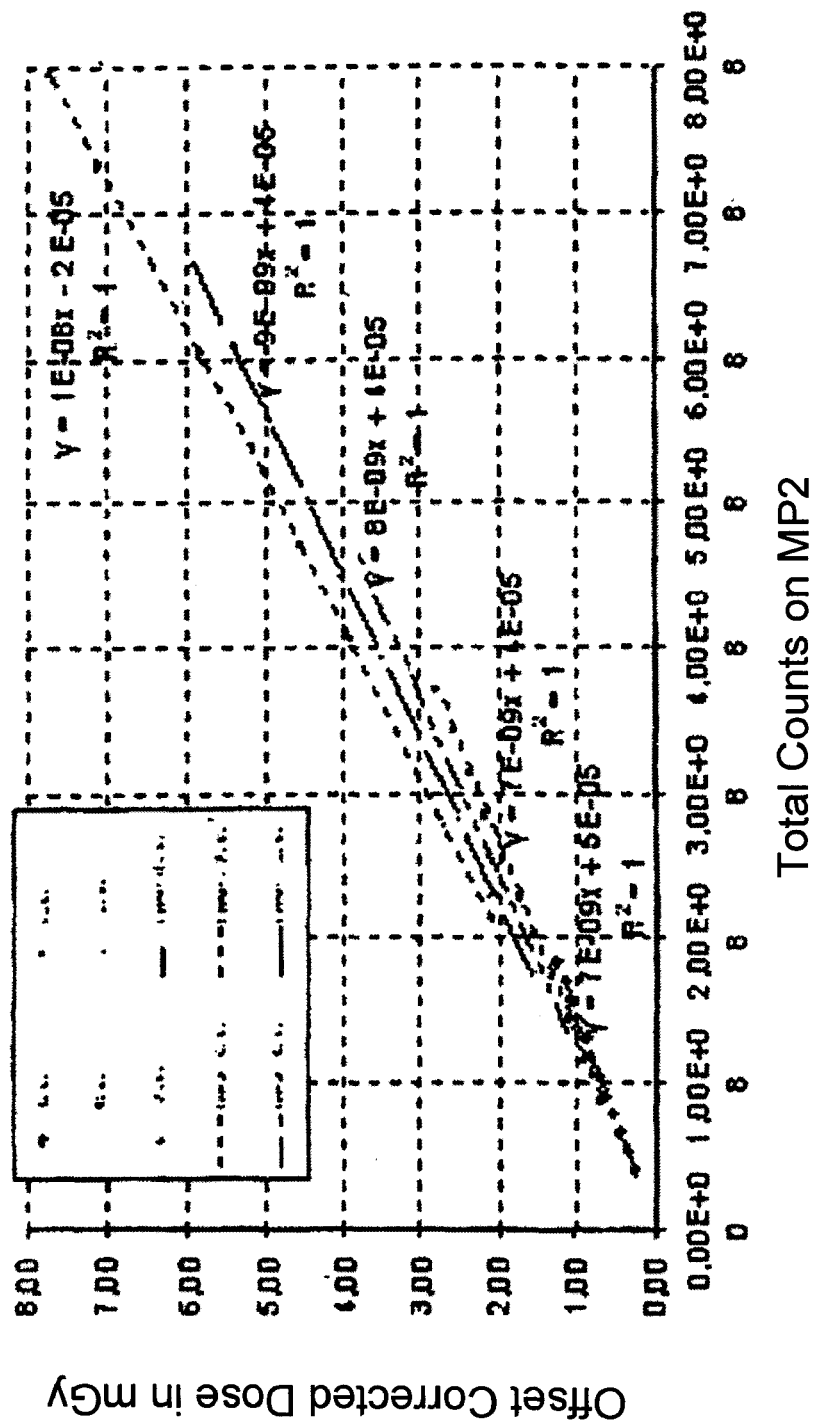
FIG. 14 A graph of offset corrected dose values vs. total counts at various W-spectra.

An improved dosimeter can be realized with this arrangement if 8 groups with different thresholds are formed like shown in FIG. 5. For example the following thresholds can be used: $E_1=4$ keV, $E_2=24$ keV, $E_3=44$ keV, $E_4=64$ keV, $E_5=84$ keV, $E_5=104$ keV, $E_7=124$ keV and $E_8=144$ keV. Let $A_i$ denote the number of detector units in group i. Let j denote the number of the group which shows no number of counts significantly above zero if the arrangement is irradiated with X-rays. An estimation of the tube voltage $U_{max}$ in Volt is $(E_{j-1}+E_j)/2$, whereby as the units for the energies the electronvolt is used. From the curve in FIG. 11 a value for the factor $\overline{L}$ as the value of $L(U)$ at $U_{max}$ can be calculated. This factor is multiplied by the number A of detector units used in the calibration and divided by the number $A_1$ of detector units in group 1. The dose is determined through $D=\overline{L}\cdot A/A_1\cdot N_1$, where $N_1$ is the sum of the counter values in group 1. With this method, the dose is determined with a precision of −3.6% to +6.3% in the condition that the tube voltage is ranging between 40 and 120 kV. FIGS. 13 and 14 show additional measuring values, which allow the determination of the dependence between the number of counts and the applied dose values.

Figure 7:
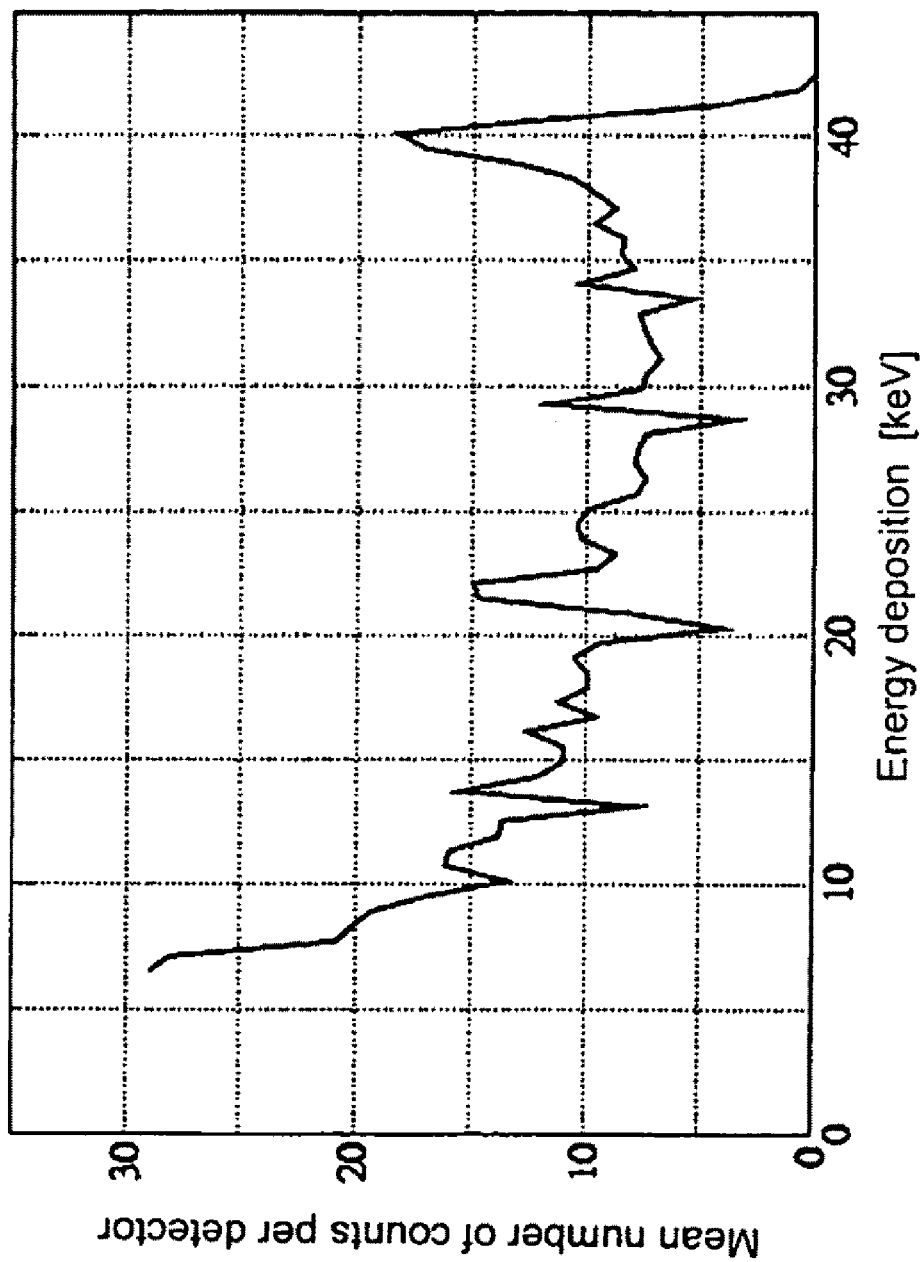
FIG. 7 is a response function of the detector arrangement of a Medipix2 chip and a silicon sensor layer of 700 micrometer thickness under irradiation with photons of 40 keV energy.

As a proof of principle for the reconstruction method for the determination of the energy spectrum through a decomposition of the measured energy deposition spectrum in a linear combination of response functions on monoenergetic irradiation, we simulated the irradiation of the arrangement of a Medipix2 chip and a sensor layer of silicon of 700 μm thickness with an X-ray tube with tungsten anode and a tube voltage of 80 kV in a Monte-Carlo-Simulation. The incident energy spectrum was reconstructed using one of the above mentioned numerical methods from the simulated deposition spectrum. FIG. 7 shows exemplarily the response function of the arrangement onto photons with an energy of 40 keV.

The proof that this embodiment example has a bigger dynamical range concerning possible processable dose rates compared to commercially available active dosimeters is given now exemplarily for photons with an energy in the diagnostic radiology energy range. We assume a silicon sensor having a thickness of 1000 μm, which is technically feasible.

The upper threshold of the measuring range concerning the dose rate is limited by the maximum counter value which can be accumulated in the counters between two readout-cycles. Currently the counters of the Medipix2 chips can be read-out with a frequency of 30 Hz. It is possible to realize higher readout frequencies. The dead-time, in which no events can be recorded, is 300 microseconds. Therefore in one second counting is possible during 999.7 milliseconds. The dead-time is therefore neglected in the following calculation. The counters can register at maximum 8000 events during the counting time. The whole arrangement comprising 256×256 detector units is therefore able to count up to $7.85*10^9$ photons per second, whereby we assume conservatively that the mean number of counts per photon is 2 due to charge sharing. Thus, the arrangement can count up to $2,83*10^{13}$ photons in one hour. If a personal equivalent dose $H_p(10)$ of 1 nSv is to be measured, 3101 photons would impinge in this example onto the area of the sensors. 2822 photons would be registered by the detector units of the arrangement. Thus, we calculate a maximum dose rate of more or less $H_p(10)=10$ Sv/h. The count rate of one detector unit in the arrangement would be around 240 kHz, which does not lead to problems in the processing of the pulses. The highest upper limit of measuring values concerning dose rate values listed for the active dosimeters in [2] is only 1 Sv/h. This shows that the measuring range of the arrangement in this embodiment example is very much higher than the measuring range of commercially available dosemeters.

The measuring range of the arrangement of counting detector units used for measurements of integral dose values like in personal dosemeters is now estimated. The upper threshold of the measuring range of an integral dose value is limited by the maximum number of counts that can be processed in the counters and the calculation unit. From the estimations for the maximum dose rate values given above it is clearly visible, that measurements of maximum integral dose values of several hundred Sievert are not a technical problem. The lower threshold of the measuring range is now estimated. In a radiation field which deposits a personal equivalent dose $H_p(10)$ (in brackets we note the corresponding values for $H_p(0.07)$) of 1 nSv with photon energies of 15 keV around 3101 (632) photons impinge onto the Medipix2-Sensor-arrangement. Of these photons more or less 2822 (576) photons would be registered and counted. The relative statistical error for the determination of the personal equivalent dose values in this example is therefore more or less 1.9 (4.2) percent. The statistical accuracies for a determination of personal equivalent dose values $H_p(10)$ ($H_p(0.07)$) at 100 keV photon energy can be estimated to be 9.0 (8.7) percent. The largest measuring range of the active dosimeters listed in [2] is only 15 nSv up to 16 Sv (realized with the EPD Mk2) in a measurement of $H_p(10)$. Thus it is proofed that a dosimeter in the invented form has a larger measuring range than commercially available dosimeters whereby an extension of the measuring range is easily possible with an enlargement of the active area of the arrangement. This can be done by using several arrangements of Medipix2 chips and sensor layers in one personal dosimeter.

Figure 12:
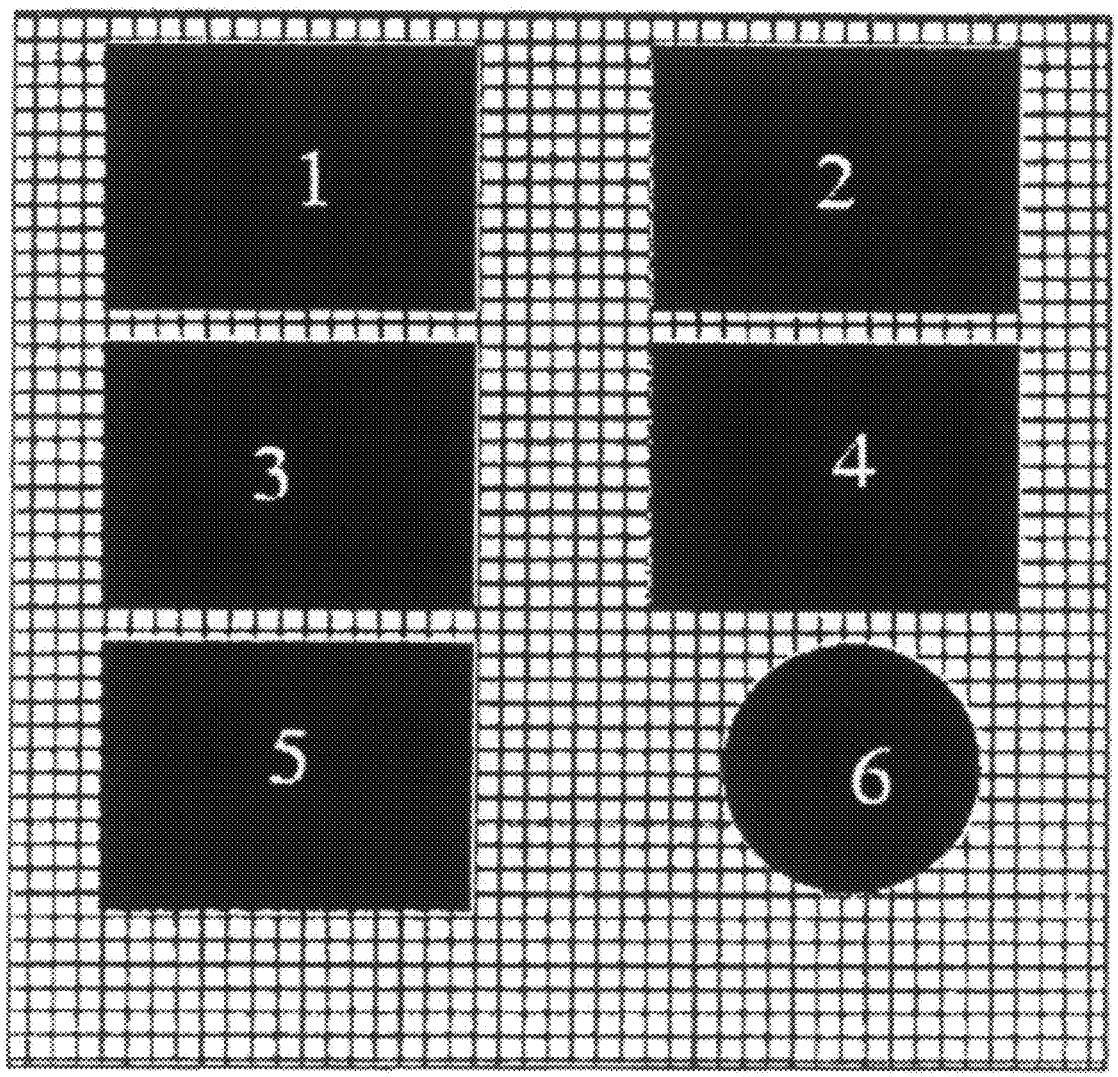
FIG. 12 shows the location of different absorbers above an arrangement of counting detector units.

FIG. 12 shows exemplarily a view onto an arrangement of counting detector units with absorbers 1-6 placed above the arrangement. This is easy to realize in our example of the Medipix2-sensor combination as an arrangement of counting detector units. The direction of main incidence is perpendicular to the drawing plane. For example the following materials can be used:

Number 1: Plastics, for example PMMA, 1 mm thickness
Number 2: Copper; 0.05 mm thickness
Number 3: Copper; 0.5 mm thickness
Number 4: Copper; 1.2 mm thickness
Number 5: Lead; 0.7 mm thickness
Number 6: Copper; 2 mm thickness Absorber 6 can be used to determine the mean angle of incidence.

By using the method and device of the invention, one can measure dose, dose rates, energy spectra in real time with a better sensitivity concerning dose and particle flux density, a larger dynamic range, a higher linearity and the possibility to increase the precision of measured dose values through a determination of the energy spectrum of the incident radiation. The determination of the incident energy spectrum improves the accuracy of dose values significantly, especially in scattered radiation.

The invention claimed is:
1. Method for determining one or more characteristics of radiation using a sensor comprising one or more detector units capable of counting the number of photon or charged particle of said radiation impinging on said sensor in or above a determined energy range, comprising the steps of
performing a calibration operation comprising the steps of
(i) producing a beam k of radiation, said beam producing a known dose $D^k$, said beam being either produced physically or simulated with a model;
(ii) determining the counts $N^k_i$ of said radiation beam comprised in an energy deposition range $[E_i, E'_i]$, said determination being obtained either by actual measurement or by a computation based on said model;
(iii) repeating step (ii) from i=1 to i=imax for a set of different energy deposition ranges $[E_i, E'_i]$;
(iv) repeating steps (i), (ii) and (iii) for a range of different beams k of radiation;
(v) determining factors $L_i$ by solving the coupled set of equations, for all k

$$D^k = \Sigma_{i=1}^{i=imax} L_i \cdot N^k_i,$$

submitting the sensor to the radiation to be measured and determining the deposition spectrum by measuring the counts $N_i$ in the energy deposition ranges $[E_i, E'_i]$;
determining the dose according to the equation $$D = \Sigma_{i=1}^{i=imax} L_i \cdot N_i.$$

2. Method for determining one or more characteristics of radiation using a sensor comprising one or more detector units capable of counting the number of photons or charged particles of said radiation impinging on said sensor in or above a determined energy range, comprising the steps of
performing a calibration operation comprising the steps of
(i) producing a monoenergetic beam of radiation with energy $E_k^{mono}$, said beam being either produced physically or simulated with a model;
(ii) determining the counts $M_{ik}$ of said radiation beam comprised in a set of energy deposition ranges $[E_i, E'_i]$, said determination being obtained either by actual measurement or by a computation based on said model;
(iii) normalizing said counts $M_{ik}$ by dividing these by the total number of impinging particles;
(iv) repeating steps (i), (ii) and (iii) for a range of different monoenergetic beams of radiation $E_k^{mono}$, from k=1 to k=kmax;
submitting the sensor to the radiation to be measured and determining the deposition spectrum by measuring the counts $N_i$ in the energy deposition ranges $[E_i, E'_i]$;
determining the energy spectrum $\tilde{N}_k$ by solving the coupled set of equations, for all i, $$N_i = \Sigma_{k=1}^{k=kmax} M_{ik} \cdot \tilde{N}_k.$$

3. Method according to claim 2, wherein the characteristic of radiation is a dose quantity, comprising the steps of
using predetermined conversion coefficients $C_k$ giving the dose quantity to be determined resulting from a unit fluence, said coefficient $C_k$ being either the ICRU coefficients $K_k$ for air kerma per unit fluence, for dose in air, or the Hp(0.07) coefficients, for dose at a depth of 0.07 mm, or the Hp(10) coefficients, for dose at a depth of 10 mm, for each energy $E_k^{mono}$;
determining the respective dose D according to the equation, wherein A is the surface area of said sensor, $$D = \Sigma_{k=1}^{k=kmax} C_k \cdot \tilde{N}_k / A.$$

4. Method according to claim 1 characterized in that the step of solving the coupled set of equations is performed by estimation, by the maximum-likelihood method, or by an iterative method.

5. Method for determining one or more characteristics of radiation using a sensor comprising one detector unit capable of counting the number of photons or charged particles of said radiation impinging on said sensor between or above one or more determined energy thresholds and adapted for modifying said energy thresholds in time, comprising the steps of
- (a) setting the one or more thresholds of said detector to selected values;
- (b) counting the number of detected signals with energies above said thresholds during an interval of time;
- (c) modifying said thresholds;
- (d) repeating steps (b) and (c) until a range of energies is covered and a spectrum is obtained.

6. Apparatus for measuring one or more characteristics of a radiation, comprising a plurality of detector units, each of said detector units comprising a sensor producing an electrical pulse in response to a photon or charged particle of said radiation impinging on said sensor;

one or more discriminators each having a threshold, and having means for comparing a value of said electrical pulse with said threshold and producing a signal in response to said value exceeding said threshold;

a counter associated with each of said discriminators for counting the number of said signals;

said apparatus comprising a calculation unit (2) adapted for computing said characteristics of said radiation from the counter data and a control unit (5) adapted for modifying said thresholds in time and/or for each detector unit.

7. Apparatus according to claim 6 characterized in that said means for comparing a value of said electrical pulse are means for comparing the height of said pulse with said threshold.

8. Apparatus according to claim 6 characterized in that said means for comparing a value of said electrical pulse comprise means for integrating said electrical pulse, and means for comparing the integral value with said threshold.

9. Apparatus according to claim 6 wherein said characteristic of radiation comprise the energy spectrum of said radiation or the maximum radiation energy or the dose.

10. Apparatus according to claim 7 wherein a layer of absorbing material is placed above a detector unit.

11. Apparatus according to claim 10 wherein a plurality of layers of absorbing material, each layer having a different thickness and/or consisting of a different material, are placed each above one or more detector units.

* * * * *